US010740715B1

(12) United States Patent
Kumar et al.

(10) Patent No.: US 10,740,715 B1
(45) Date of Patent: Aug. 11, 2020

(54) ADAPTIVE COMBINED ORDER MANAGEMENT

(71) Applicant: DOORDASH, INC., San Francisco, CA (US)

(72) Inventors: Abhay Raj Kumar, San Francisco, CA (US); Jesse Lee Reiss, San Francisco, CA (US); Ajit Kalidindi Varma, San Francisco, CA (US); Matthew Rhodes, San Francisco, CA (US); Richard David Din, Newark, CA (US); Anthony Bishopric, San Francisco, CA (US)

(73) Assignee: DOORDASH, INC., San Francisco, CA (US)

( * ) Notice: Subject to any disclaimer, the term of this patent is extended or adjusted under 35 U.S.C. 154(b) by 0 days.

(21) Appl. No.: 16/367,330

(22) Filed: Mar. 28, 2019

Related U.S. Application Data

(63) Continuation of application No. 14/978,307, filed on Dec. 22, 2015, now Pat. No. 10,262,292, which is a (Continued)

(51) Int. Cl.
*G06Q 30/00* (2012.01)
*G06Q 10/08* (2012.01)
(Continued)

(52) U.S. Cl.
CPC ..... *G06Q 10/0835* (2013.01); *G06Q 30/0635* (2013.01); *G06Q 30/0641* (2013.01); *G06Q 50/12* (2013.01)

(58) Field of Classification Search
CPC .................................................. G06Q 30/00
See application file for complete search history.

(56) References Cited

U.S. PATENT DOCUMENTS 5,751,245 A    5/1998   Janky et al.
6,026,375 A    2/2000   Hall et al.
(Continued)

FOREIGN PATENT DOCUMENTS

CN           103377437 A     10/2013

OTHER PUBLICATIONS

Final Office Action dated Aug. 9, 2019, for U.S. Appl. No. 14/642,875, of Reiss, J.L., et al., filed Mar. 10, 2015.
(Continued)

*Primary Examiner* — Naeem U Haq
(74) *Attorney, Agent, or Firm* — Mattingly & Malur, PC

(57) ABSTRACT

In some examples, a computing device may receive, from a first user device, a communication indicating a request to create a combined order for items offered by one or more merchants. For example, the combined order may enable a plurality of users to independently purchase individual ones of the items from the one or more merchants. The combined order may be created having an initial condition and may be accessible by the plurality of users for adding items to the combined order. At least one selection of a respective item may be received from each user of the plurality of users. For instance, each selection may change the condition of the combined order. In addition, the computing device may process the items added to the combined order as a single order to perform at least one action.

22 Claims, 8 Drawing Sheets

Related U.S. Application Data continuation of application No. 14/625,680, filed on Feb. 19, 2015, now Pat. No. 9,269,103.

(51) Int. Cl.
*G06Q 30/06* (2012.01)
*G06Q 50/12* (2012.01)

(56) References Cited

U.S. PATENT DOCUMENTS

| | | | |
|---|---|---|---|
| 6,206,750 B1 | 3/2001 | Barad et al. | |
| 6,269,343 B1* | 7/2001 | Pallakoff | G06Q 30/02 705/26.2 |
| 7,181,419 B1* | 2/2007 | Mesaros | G06Q 30/0224 705/26.2 |
| 8,458,044 B2 | 6/2013 | Blair et al. | |
| 8,504,435 B2 | 8/2013 | Charles | |
| 9,269,103 B1 | 2/2016 | Kumar et al. | |
| 9,466,045 B1 | 10/2016 | Kumar | |
| 9,679,489 B2 | 6/2017 | Lambert et al. | |
| 9,767,471 B1* | 9/2017 | Perrone | G06Q 30/0631 |
| 10,043,149 B1 | 8/2018 | Iacono et al. | |
| 10,176,448 B1 | 1/2019 | Rhodes et al. | |
| 10,262,292 B1 | 4/2019 | Kumar et al. | |
| 10,319,053 B1 | 6/2019 | Kohli | |
| 2002/0077937 A1 | 6/2002 | Lyons et al. | |
| 2003/0225679 A1* | 12/2003 | Tenorio | G06Q 30/06 705/37 |
| 2006/0206395 A1 | 9/2006 | Vallabh | |
| 2006/0235754 A1 | 10/2006 | Walker et al. | |
| 2007/0043651 A1 | 2/2007 | Xiao et al. | |
| 2008/0052163 A1 | 2/2008 | Koh | |
| 2008/0140577 A1* | 6/2008 | Rahman | G06Q 20/3829 705/71 |
| 2009/0187488 A1 | 7/2009 | Shamilian | |
| 2011/0202390 A1 | 8/2011 | Reese et al. | |
| 2011/0295722 A1 | 12/2011 | Reisman | |
| 2011/0320362 A1* | 12/2011 | Van Horn | G06Q 30/06 705/80 |
| 2012/0036028 A1 | 2/2012 | Webb | |
| 2012/0143656 A1* | 6/2012 | Murphy | G06Q 30/0207 705/14.1 |
| 2012/0197722 A1 | 8/2012 | Mesaros | |
| 2012/0203619 A1 | 8/2012 | Lutnick et al. | |
| 2012/0203708 A1 | 8/2012 | Psota et al. | |
| 2012/0215657 A1 | 8/2012 | Compton et al. | |
| 2013/0006747 A1 | 1/2013 | Wu | |
| 2013/0018711 A1* | 1/2013 | Winslade | G06Q 30/02 705/14.4 |
| 2013/0046605 A1 | 2/2013 | Baron et al. | |
| 2013/0054323 A1 | 2/2013 | Charles | |
| 2013/0132179 A1* | 5/2013 | Wu | G06Q 30/02 705/14.23 |
| 2013/0132220 A1* | 5/2013 | Baum | G06Q 30/02 705/26.1 |
| 2013/0211944 A1* | 8/2013 | Momin | G06Q 30/02 705/26.2 |
| 2013/0246207 A1 | 9/2013 | Novak et al. | |
| 2013/0268369 A1* | 10/2013 | McMaster | G06Q 30/01 705/14.66 |
| 2013/0290172 A1 | 10/2013 | Mashinsky | |
| 2013/0317940 A1 | 11/2013 | Fitz | |
| 2014/0011522 A1 | 1/2014 | Lin et al. | |
| 2014/0089135 A1 | 3/2014 | Linh et al. | |
| 2014/0156452 A1 | 6/2014 | Lupo | |
| 2014/0164126 A1 | 6/2014 | Nicholas et al. | |
| 2014/0188650 A1 | 7/2014 | Sun et al. | |
| 2014/0188750 A1 | 7/2014 | Seiler | |
| 2014/0226487 A1 | 8/2014 | Forssell et al. | |
| 2014/0309987 A1 | 10/2014 | Maddali et al. | |
| 2014/0370167 A1 | 12/2014 | Garden | |
| 2015/0227888 A1 | 8/2015 | Levanon et al. | |
| 2015/0262121 A1 | 9/2015 | Riel-Dalpe et al. | |
| 2015/0304436 A1 | 10/2015 | Vaccari et al. | |
| 2016/0078516 A1 | 3/2016 | Alnuwaysir et al. | |

OTHER PUBLICATIONS

Horn, L., "Groupon Now Provides Instant Location-Based Deals," PC Magazine Online, dated May 11, 2011, ProQuest Dialog, Retrieved from the Internet URL: http://search.proquest.com/professional/docview/1092618010?accountid=161862, on Nov. 2, 2015, pp. 1-2.

Kauffman, R.J., and Wang, B., "Bid Together, Buy Together: On the Efficacy of Group-Buying Business Models in Internet-Based Selling," Carlson School of Management, last revised on May 16, 2001, pp. 1-44.

Zheng, Y., et al., "Geolife2.0: A Location-Based Social Networking Service," 2009 Tenth International Conference on Mobile Data Management: Systems, Services and Middleware, IEEE Xplore, pp. 357-358 ( 2009 ).

Non-Final Office Action dated May 26, 2015, for U.S. Appl. No. 14/625,680, of Kumar, A.R., et al., filed Feb. 19, 2015.

Notice of Allowance dated Nov. 6, 2015, for U.S. Appl. No. 14/625,680, of Kumar, A.R., et al., filed Feb. 19, 2015.

Non-Final Office Action dated Jan. 11, 2018, for U.S. Appl. No. 14/625,683, of Kumar, A.R., et al., filed Feb. 19, 2015.

Non-Final Office Action dated Jan. 18, 2018, for U.S. Appl. No. 14/985,267, of Rhodes, M., et al., filed Dec. 30, 2015.

Non-Final Office Action dated Jan. 26, 2018, for U.S. Appl. No. 14/838,446, of Kohli, A., filed Aug. 28, 2015.

Non-Final Office Action dated Feb. 28, 2018, for U.S. Appl. No. 14/642,875, of Reiss, J.L., et al., filed Mar. 10, 2015.

Notice of Allowance dated Apr. 6, 2018, for U.S. Appl. No. 14/870,886, of Iacono, J.F., et al., filed Sep. 30, 2015.

Non-Final Office Action dated May 18, 2018, for U.S. Appl. No. 14/978,307, of Kumar, A.R., et al., filed Dec. 22, 2015.

Final Office Action dated Aug. 28, 2018, for U.S. Appl. No. 14/642,875, of Reiss, J.L., et al., filed Mar. 10, 2015.

Notice of Allowance dated Aug. 31, 2018, for U.S. Appl. No. 14/985,267, of Rhodes, M., et al., filed Dec. 30, 2015.

Final Office Action dated Sep. 7, 2018, for U.S. Appl. No. 14/625,683, of Kumar, A.R., et al., filed Feb. 19, 2015.

Final Office Action dated Sep. 21, 2018, for U.S. Appl. No. 14/838,446, of Kohli, A., filed Aug. 28, 2015.

Notice of Allowance dated Nov. 30, 2018, for U.S. Appl. No. 14/978,307, of Kumar, A.R., et al., filed Dec. 22, 2015.

Notice of Allowance dated Feb. 1, 2019, for U.S. Appl. No. 14/838,446, of Kohli, A., filed Aug. 28, 2015.

Non-Final Office Action dated Feb. 21, 2019, for U.S. Appl. No. 14/642,875, of Reiss, J.L., et al., filed Mar. 10, 2015.

Non-Final Office Action dated Jun. 24, 2019, for U.S. Appl. No. 14/667,764, of Reiss, J.L., et al., filed Mar. 25, 2015.

* cited by examiner

ADAPTIVE COMBINED ORDER MANAGEMENT

CROSS-REFERENCE TO RELATED APPLICATION

This application is a continuation of, and claims priority to, U.S. patent application Ser. No. 14/978,307, filed Dec. 22, 2015, issued as U.S. Pat. No. 10,262,292, which is a continuation of, and claims priority to, U.S. patent application Ser. No. 14/625,680, filed Feb. 19, 2015, issued as U.S. Pat. No. 9,269,103, which applications are incorporated herein by reference.

BACKGROUND

People enjoy eating quality food that is prepared by good restaurants. Nevertheless, sometimes people may not want to go to a restaurant, but instead may prefer to have food delivered to them. To meet this demand, a courier may deliver food prepared by a restaurant to a customer at a delivery location. For example, a service may enable customers to order food items from any of a variety of restaurants, and may arrange for couriers to deliver the food items from the restaurants to the customers. Typically, there may be additional expenses associated with having the food items delivered to the customer, such as for compensating the courier for delivery of the food items. Consequently, customers may prefer to minimize the additional expenses associated with having the food items delivered to them.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
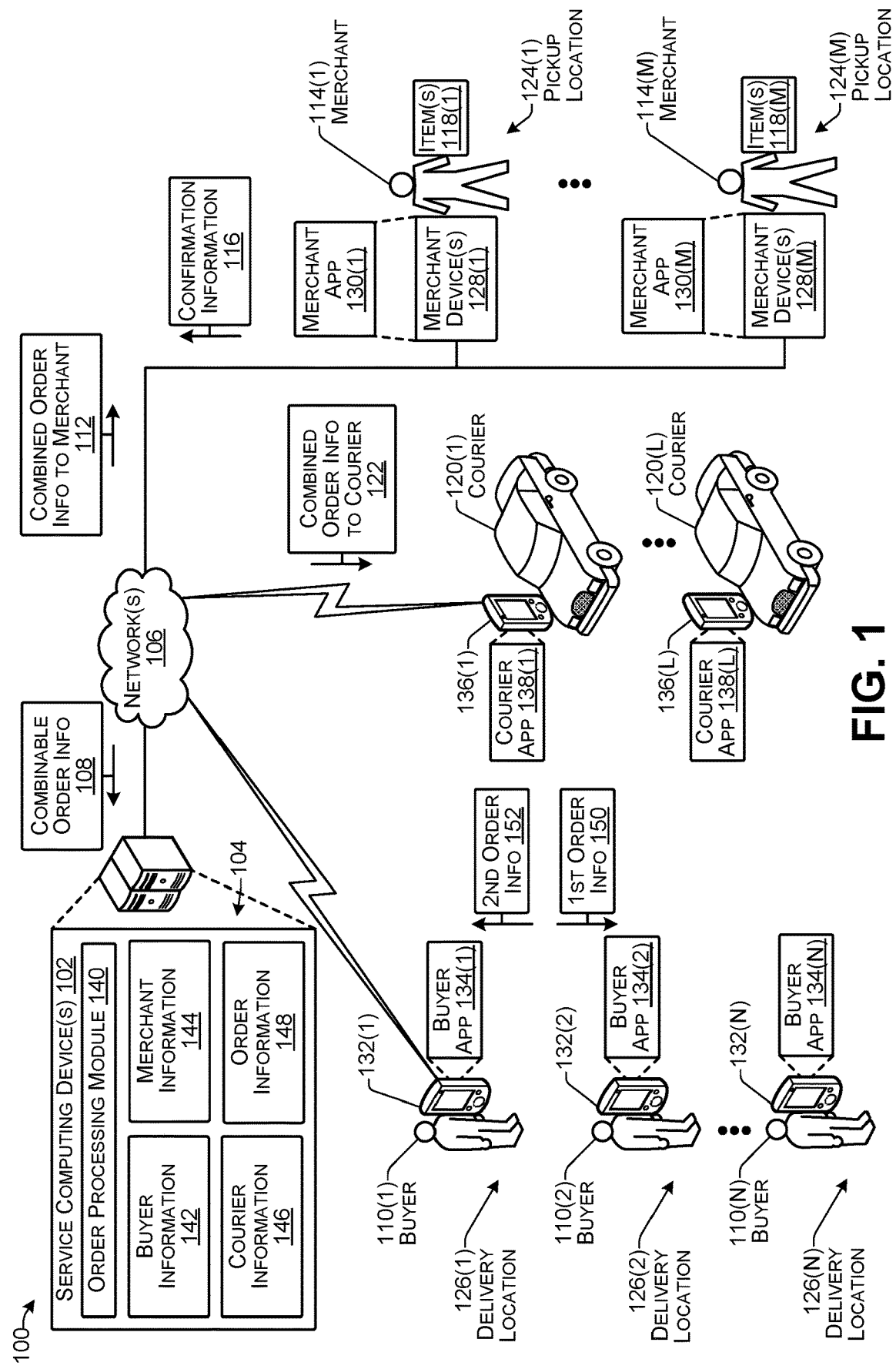
FIG. 1 illustrates an example environment for ordering combined orders for delivery according to some implementations.

Some implementations herein provide technological innovations for a novel ecosystem in which buyers, who want to place orders for delivery, are motivated to provide an opportunity for other buyers to participate in combined orders. In some examples, a first buyer who is placing an order is provided with an incentive to actively solicit other buyers to participate in a combined order with the first buyer, thereby benefiting both the first buyer and the other buyers. The technology herein employs a plurality of computing devices, mobile devices, and location sensors to provide a novel technological arrangement that enables buyers to combine orders for delivery with other buyers, regardless of whether the buyers know each other or not.

Further, the technology herein can allow any person with a mobile device to immediately become a courier, or cease to be a courier, in a courier network that provides delivery services for delivery of items from merchants to buyers. Through the interaction of computing devices, mobile devices, and location sensors, implementations herein can manage an unpredictable sharing ecosystem in which a large number of people are able to start serving as couriers, or cease serving as couriers, as necessary, to accommodate ever changing circumstances and conditions of the merchants, the buyers, the service region, and the couriers themselves. Consequently, the technology disclosed herein enables efficient crowdsourcing of courier services in an on-demand manner from a varying group of people for providing a delivery service to merchants and buyers, and which can further enable buyers to minimize delivery expenses by combining orders to be delivered by the couriers.

Some implementations described herein include techniques and arrangements for combining orders for items that are to be delivered to multiple different buyers. As one example, a first buyer may use an application on a first buyer device to create a first order by selecting one or more items, such as food items, offered by a first merchant, such as a restaurant. The first buyer device may further send a communication to one or more other buyer devices within a threshold proximity to the first buyer device. For instance, the communication may indicate that the first buyer is placing an order for one or more items from the first merchant, and may invite the nearby buyers to place an order that may be combined with the first order created by the first buyer. In some cases, the first buyer and the other buyers may be motivated to create a combined order based on an incentive, such as a reduction in an amount of a delivery fee that will be paid by the buyers. For example, the delivery fee for the combined order may be divided between the first buyer and any other buyers who decide to place an order, thereby resulting in a discounted fee to the buyers who participate in the combined order.

As one example, a second buyer who has an instance of the buyer application installed on the second buyer device may receive a communication inviting the second buyer to place an order that may be combined with the first order of the first buyer. The second buyer may use the buyer application to select one or more items to purchase from the first merchant, thereby creating a second order that is associated with the second buyer. Subsequently, at least one of the first buyer or the second buyer may send the combined order to a service computing device of a service provider. The service provider may send the combined order to the first merchant, who may prepare the ordered items. The service provider may arrange for a courier to pick up the ordered items and deliver the items to the first buyer and the second buyer, such as at a common delivery location. Accordingly, because the courier only has to make one pickup and one delivery, a delivery fee associated with the combined order may be divided between the first buyer and the second buyer.

The buyers may be able to create a combined order using any of several different techniques. For instance, a first buyer may use a buyer application on the first buyer device, e.g., a mobile computing device or other type of computing device, as enumerated elsewhere herein, to start an order. The first buyer may interact with a graphic user interface (GUI) presented by the application to select one or more items for delivery from a particular merchant. The first buyer may select an option presented by the buyer application to determine whether there are other nearby buyers who may be interested in creating a combined order with the first buyer. In some examples, the application may only contact nearby buyers who are already known to the first buyer, while in other examples, the application may contact any nearby buyer who also has an instance of the buyer application installed on that buyer's device, and who has indicated a desire to receive such communications. In some instances, the application may send to the other buyer devices at least a portion of the first order information of the first buyer, such as an identity of the particular merchant from which the first buyer intends to order the one or more items. Further, in some cases, the application may send to the other buyer devices additional order information, such as first buyer identifying information, first buyer delivery location, the one or more items that the first buyer has selected to order, comments by the first buyer or other buyers about the particular merchant, or the like.

In some implementations, the buyer application may limit the buyer devices contacted for forming a combined order to those buyer devices currently within a threshold proximity to the first buyer device. For instance, the buyer application may access a wireless communication interface on the buyer device, such as a Wi-Fi communication interface, BLUETOOTH® low energy (BLE) communication interface, or the like. The application may communicate with any other devices that have the buyer application installed and that have access to the same Wi-Fi access point, or that are within radio communication range using, e.g., BLE communications or other close range wireless communication technologies, such as infrared communications. As another example, the buyer application may communicate with a geo-fence set up for a particular area within which the first buyer device is currently located, and the buyer application may send the invitation only to other buyer devices determined to be within the geo-fenced area.

A second buyer who receives the invitation to join in a combined order can create a second order to be added to the first order to create a combined order. For instance, the buyer application may present a menu associated with the particular merchant in a GUI on the second buyer's device. The second buyer may select one or more items as a second order associated with the second buyer. Accordingly, the combined order may include the first order associated with the first buyer, and the second order associated with the second buyer. Either the first buyer or the second buyer may send the combined order information to a service computing device of the service provider. For instance, the first buyer may send both the first order and the second order, the second buyer may send both the first order and the second order, or the first buyer may send the first order and the second buyer may send the second order, and at least one of the sent orders may include an indication that it is to be combined with the other sent order.

As another example, the first buyer may use the buyer application to select one or more items for placing a first order with a particular merchant. The first buyer may send the first order information to the service computing device and may further indicate a desire to create a combined order. The service computing device may determine a delivery location for the first order, which in some cases may be the same as the current location of the first buyer device, or an address specified by the first buyer when providing the first order information. The service computing device may send a communication to other buyer devices within a threshold distance of the delivery location, informing the other buyers of the opportunity for creating combined order from the particular merchant. If another buyer is interested in ordering from the particular merchant, the other buyer may respond to the invitation with one or more selected items as a second order associated with the other buyer.

As another example, when a second buyer opens the buyer application to place an order, the service computing device may determine that the delivery location of the second buyer is within a threshold distance of the delivery location of the first buyer. Based on this, the service computing device may send an offer for a discounted delivery fee if the second buyer orders from the particular merchant, such as before a time limit agreed to by the first buyer expires.

The service provider receives the second order information from the second buyer and may associate the second order information with the first order information as combined order information. The service provider may send the combined order information, including the first order information and the second order information, to the particular merchant. The service provider may further schedule a courier to pick up the combined order from a pickup location of the particular merchant. Thus, the courier may deliver the first order to the first buyer and the second order to the second buyer, at the same delivery location or at delivery locations within a threshold distance of each other.

In some examples, the service computing device may send the invitation to join a combined order to other buyers that are known to the first buyer, such as may have been indicated by a contacts list, or the like, received from the first buyer device. In other examples, the other buyers who receive the communication may or may not know the first buyer, and may be selected to receive the communication based on proximity to the delivery location specified by the first buyer. For instance, two or more buyers who participate in a combined order may be located in the same office building, same apartment complex, same neighborhood, or the like, and may or may not know each other.

As one example, the first buyer may elect to pause delivery briefly (e.g., 10 minutes, 20 minutes, etc.) to allow other buyers having delivery locations within a threshold distance of the delivery location of the first buyer to participate in a combined order with the order of the first buyer. For example, buyers who are currently within the threshold distance of the first buyer's delivery location may receive, from the service computing device, a broadcasted message, a push communication, or the like, to inform the buyers that if they place an order from the merchant selected by the first buyer within a specified time, they can receive a discount on their order.

As another example, suppose that when placing the order, the first buyer is at work, but is planning to go home to receive the order. Accordingly, when placing the order, the first buyer may specify the delivery location to be the home address of the first buyer even though the first buyer is not currently near the home address. Consequently, the other buyers who receive the communication to join the order of the first buyer may be within a threshold distance of the first buyer's home address and/or may have delivery locations within a threshold distance of the first buyer's home address. Accordingly, the other buyers who receive the communication to participate in a combined order also may or may not be currently at their respective delivery locations.

Furthermore, in some examples the buyers may not necessarily order from the same merchant when creating a combined order. For example, a first buyer may place a first order from a first merchant, and a second buyer may place a second order from a second merchant that is within a threshold distance from the first merchant. Accordingly, since the first merchant and second merchant are located within a threshold proximity to one another, the courier may pick up both orders without much additional time expenditure and may deliver the respective orders to the delivery location(s) of the first buyer and the second buyer. As mentioned above, the delivery location of the first buyer and the delivery location of the second buyer may be the same delivery location, or may be delivery locations that are otherwise within a threshold distance of each other.

In some examples, a buyer who is interested in paying a reduced delivery fee may be presented with a listing of merchants at which orders are currently pending, and which orders have delivery locations within a threshold distance of the delivery location of the buyer. Accordingly, the buyer may select a merchant from this list for placing an order, which may result in a discounted delivery fee for the order. As another example, if the buyer does not care to order from the merchants currently available, the buyer may indicate a desire to be notified when additional merchants are selected for orders to be delivered to a delivery location within a threshold distance of the buyer's delivery location. As still another example, a buyer may indicate a desire to be notified whenever a particular merchant has a pending order that will be delivered to a delivery location within a threshold distance of the buyer's delivery location.

As used herein, an order may include a request submitted by a buyer (e.g., a customer) for the acquisition of food items and/or other goods (referred to herein as items) from a merchant. The order information may be received by the service and sent to the merchant. For example, a merchant may include a restaurant or any other business or other entity engaged in the offering of items for delivery to buyers. Actions attributed to a merchant herein may include actions performed by employees or other agents of the merchant and, thus, no distinction is made herein between merchants and their employees unless specifically discussed. In addition, a buyer may include any entity that purchases items from a merchant. Buyers may be customers or potential customers of a particular merchant. The service may receive payment from a buyer for an order and the service may provide payment to the merchant for the order. Further, the service may provide payment to the courier for delivering the order.

For discussion purposes, some example implementations are described in the environment of combining orders for delivery, such as to provide a reduction in expenses to buyers. However, implementations herein are not limited to the particular examples provided, and may be extended to other service environments, other system architectures, other types of goods, other advantages, and so forth, as will be apparent to those of skill in the art in light of the disclosure herein.

FIG. 1 illustrates an example environment 100 for combining orders for delivery according to some implementations. For instance, the environment 100 may enable one or more service computing devices 102 of a service provider 104 to receive, over one or more networks 106, combinable order information 108 from a plurality of buyers 110(1), 110(2), . . . , 110(N). The combinable order information 108 may include order information for a plurality of orders associated with a plurality of respective buyers 110. Based on the combinable order information 108 received from the buyers 110, the service computing device 102 may send combined order information 112 to a particular merchant 114 of a plurality of merchants 114(1)-114(M). The particular merchant 114 may receive the combined order information 112, and may respond with confirmation information 116 to confirm that the combined order has been received and will be prepared by the particular merchant 114.

In some examples, the combined order information 112 sent to the merchant 114 may identify items 118 ordered by the buyers 110 from the particular merchant 114. For instance, each merchant 114(1)-114(M) may offer one or more items 118(1)-118(M), respectively, which may be ordered by buyers 110 for delivery. In some cases, the combined order information 112 may also specify a time at which the combined order is to be picked up by a courier 120 of a plurality of couriers 120(1)-120(L). For instance, the confirmation information 116 sent by the merchant 114 to the service computing device 102 may confirm the pickup time specified by the service computing device 102. In other cases, the combined order information 112 sent to the merchant 114 may include an inquiry as to when the order will be ready, and the merchant 114 may include with the confirmation information 116 a specified time at which the combined order will be ready for pickup.

In either event, in response to receiving the confirmation information 116 from the particular merchant 114, the service computing device 102 may send combined order information 122 to a particular courier 120 who will pick up the combined order from the particular merchant 114 and deliver the combined order to the buyers 110 participating in the combined order. For instance, each merchant 114(1)-114(M) may be associated with a respective pickup location 124(1)-124(M), which may typically be the merchant's place of business. Furthermore, each buyer 110(1), 110(2), . . . 110(N) may be associated with a respective delivery location 126(1), 126(2), . . . 126(N). In some examples, to enable participation in a combined order, two or more buyers 110 may be associated with the same delivery location 126 or, alternatively, the delivery locations 126 of two or more buyers 110 may not be the same, but may still be within a threshold distance of each other.

The combined order information 122 sent to the courier 120 may include the pickup location for the order, the pickup time, and the delivery location for the order. In some examples, the combined order information 122 may further include a contract time, i.e., a time by which the service provider 104 has agreed to have the ordered items 118 delivered to the buyers 110 at the delivery location(s) 126. Further, in some cases, the combined order information 122 may include an amount that the courier 120 will be paid if the courier 120 accepts the delivery job, and/or other information related to the combined order.

In the illustrated example, the service computing device 102 of the service provider 104 is able to communicate with merchant devices 128(1)-128(M) over the one or more networks 106. Each merchant device 128(1)-128(M) may be associated with a respective merchant 114(1)-114(M). Each merchant device 128(1)-128(M) may be a computing device, such as a desktop, laptop, tablet, smart phone, or the like, and may include a respective instance of a merchant application 130(1)-130(M) that executes on the respective merchant device 128(1)-128(M). For example, the merchant application 130 may be configured to communicate with the service computing device 102, such as for receiving the combined order information 112 and for sending the confirmation information 116. In some examples, the merchant application 130 and the service computing device 102 may communicate with each other via one or more application programming interfaces (APIs). Further, the merchant device 128 may include one or more output devices, such as speakers (not shown in FIG. 1), that the merchant application 130 may use to audibly notify the respective merchant 114 that an order has been received. Additionally, or alternatively, the merchant device 128 may include a display (not shown in FIG. 1) that the merchant application 130 may use for presenting the combined order information 112 to the merchant 114. For instance, the merchant application 130 on the merchant device 128 may present the combined order information 112 in one or more GUIs.

In some examples, the merchant application 130 may provide point-of-sale (POS) functionality to the merchant device 128 to enable the merchant 114 to accept payments using the merchant device 128. Alternatively, in some examples, the merchant device 128 may be a fax machine and the merchant 114 may receive the combined order information 112 via a facsimile transmission from the service computing device 102. As still another example, the merchant device 128 may be a computing device that is configured to receive order information via email, instant messaging, or other electronic communication. As still another example, the merchant device 128 may be a phone, and the merchant device 128 may receive the combined order information 112 via an SMS (short messaging service) text message, voicemail, telephone call, or the like.

In addition, the buyers 110(1), 110(2), . . . 110(N) may be associated with respective buyer devices 132(1), 132(2), . . . 132(N) that may execute respective instances of buyer applications 134(1), 134(2), . . . 134(N). For example, buyers 110 may use buyer devices 132, such as smart phones, tablet computers, wearable computing devices, laptops, desktops, or the like, and these buyer devices 132 may have installed thereon the buyer application 134. The buyer application 134 may enable the buyer 110 to select one or more items 118 to purchase from one or more of the merchants 114 to be delivered to the buyer 110 by one or more of the couriers 120. For example, the buyer application 134 may present one or more GUIs on a display for enabling the buyer 110 to select one or more items for an order.

Further, the buyer application 134 may enable the buyer 110 to place an order from a merchant 114 in advance, such as for scheduling an order for delivery at a later time on the same day, at a specified time on a future day, or the like. For instance, the buyer 110 may be able to place an order through the buyer application 134 to have lunch delivered at a specified delivery location by a specified time on a specified day. The buyer application 134 may further enable the buyer 110 to make a payment for an order using the buyer application 134. For instance, the service provider 104 may charge a buyer account associated with the buyer 110 for an amount associated with a particular order. In some examples, the buyer application 134 and the service computing device 102 may communicate with each other via one or more APIs. Additionally, or alternatively, the buyer application 134 may be a web browser, or the like, and the buyer 110 may navigate to a website associated with the service provider 104, and may use the website associated with the service provider 104 to place an order. Thus, in this case, the website may provide at least some of the functionality attributed to buyer application herein.

In addition, the couriers 120(1)-120(L) may be associated with respective courier devices 136(1)-136(L) that may execute respective instances of courier applications 138(1)-138(L). For example, couriers 120 may use courier devices 136, such as smart phones, tablet computers, wearable computing devices, laptops, or the like, as further enumerated elsewhere herein, and these courier devices 136 may have installed thereon the courier application 138. The courier application 138 may be configured to receive the combined order information 122 from the service computing device 102 to provide a particular courier 120 with information for picking up a particular order from a merchant's pickup location 124 and for delivering the order to one or more buyer delivery locations 126. The courier application 138 may further enable the courier 120 to respond to the service computing device 102 to confirm acceptance of a delivery job. Additionally, in some cases, the courier application 138 may provide the service computing device 102 with an indication of a current location of a particular courier 120. In some examples, the courier application 138 and the service computing device 102 may communicate with each other via one or more APIs. Alternatively, in other examples, the courier device 136 may receive the combined order information 122 via an SMS text message, a voicemail, a telephone call, or the like.

The one or more networks 106 can include any appropriate network, including a wide area network, such as the Internet; a local area network, such an intranet; a wireless network, such as a cellular network, a local wireless network, such as Wi-Fi and/or close-range wireless communications, such as BLUETOOTH® and BLUETOOTH® low energy; a wired network; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102, the merchant devices 128, the buyer devices 132, and/or the courier devices 136 are able to communicate over the one or more networks 106 using wired or wireless connections, and combinations thereof.

In the illustrated example, the service computing device 102 includes an order processing module 140 that may be executed on the service computing device 102 to provide, at least in part, the functionality attributed to the service computing device 102. The order processing module 140 may receive the combinable order information 108 from the buyers 110 and may associate the combinable order information 108 with buyer information 142 and merchant information 144. For instance, based on buyer identifying information that may be included with each order included in the combinable order information 108, the order processing module 140 may associate particular portions of the combinable order information 108 with particular buyer accounts. As one example, a first order of the combinable order information 108 may be associated with a first buyer account of a first buyer who placed the first order, a second order of the combinable order information 108 may be associated with a second buyer account of a second buyer who placed the second order, and so forth. The order processing module 140 may access a buyer account included in the buyer information 142 to charge a particular buyer account for a particular order. For instance, when a buyer signs up for service, or otherwise uses the service, the buyer may provide a credit card or other payment card information to enable the service provider to charge the account of the buyer for orders placed by the buyer.

Further, based on a particular merchant 114 identified by the combinable order information 108, the order processing module 140 may associate the combinable order information 108 with a merchant account of the particular merchant. The order processing module 140 may access the merchant account to determine contact information for sending the combined order information 112 to the correct merchant device 128 so that the particular merchant can receive and provide confirmation of the order. The order processing module 140 may further access the merchant account of the particular merchant to credit payment to the particular merchant that prepares the order.

In addition, the order processing module 140 may access courier information 146 to determine courier contact information for sending the combined order information 122 to a particular courier 120 of the plurality of couriers 120(1)-120(L), such as to determine whether the particular courier 120 is willing to accept the delivery job of delivering the combined order to the buyers. The particular courier 120 may use the courier application 138 on the courier device 136 to receive a message with information about the combined order, and to respond with acceptance of the delivery job if the delivery job is accepted. The particular courier 120 may subsequently pick up the combined order from the particular merchant 114 and deliver the combined order to the particular buyers 110 at the specified delivery location(s) 126. When the courier 120 has completed delivery of the combined order to the delivery location(s) 126, the courier 1220 may use the courier application 138 to inform the order processing module 140 that the delivery has been completed. The order processing module 140 may access a courier account included in courier information 146 for the particular courier 120 to credit the courier account of the particular courier 120 with payment for the delivery job.

The order processing module 140 may store information associated with each order as order information 148. For instance, the order information 148 may include a day of the week, date, and time at which each order is received from the respective buyer 110. The order information 148 may further include, for each order, merchant identifying information; buyer identifying information; items 118 ordered; the pickup location 124; the delivery location 126; preparation time for the order; location of the courier 120 when the courier accepts delivery of the order; time that the order is picked up by the courier 120; time that the order is delivered; amount paid for the order; estimated delivery time provided to the buyer by the service provider; and so forth.

As one example, suppose that a first buyer 110(1) decides to place an order for delivery. The first buyer 110(1) may access the buyer application 134(1) on the first buyer device 132(1) to be presented with a GUI (not shown in FIG. 1) that enables the first buyer 110(1) to place an order. For example, the GUI may present, for selection, information related to items available for delivery from a plurality of different merchants. Further, the buyer application may receive, via the GUI, a buyer input to select an item 118 offered by a particular merchant 114 of the plurality of merchants 114 (1)-114(M). As one example, the first buyer 110(1) may scroll through a plurality of different merchants and select the particular merchant 114 from which to order. The GUI may then present a menu of items offered by the particular merchant 114. The first buyer 110(1) may scroll through the menu and select one or more items 118 provided by the particular merchant 114 that the first buyer 110(1) would like to have delivered to a delivery location 126(1) associated with the first buyer 110(1).

When the first buyer 110(1) has finished selecting particular items 118 for delivery, the first buyer 110(1) may select an option to request creation of a combined order to attempt to reduce the delivery fees that may be charged for the order. As one example, the buyer application 134(1) may attempt to contact nearby buyer devices 132 that may also have instances of the buyer application 134 installed thereon, such as through Wi-Fi or short range wireless communications, through communication with the service computing device 102, or the like. Accordingly, the buyer application 134(1) may determine that a second buyer device 132(2) associated with a second buyer 110(2), and having a second instance of the buyer application 134(2) installed thereon, is within a threshold distance of the first buyer device 132(1). For instance, the threshold distance may be limited to being within the same room, in the same building, at the same delivery address, in the same neighborhood, connected to the same Wi-Fi access point, or the like. As one example, the threshold distance may be sufficiently close to the first delivery location 126(1) associated with the first order such that a courier 120 that delivers the combined order will not have to travel more than a few minutes to deliver a second order to a second delivery location 126(2) that may be associated with the second buyer 110(2).

When one or more other buyer devices having the buyer application 134 are determined to be within the threshold distance, the first buyer application 134(1) may cause the first buyer device 132(1) to send a communication inviting the nearby buyers to create a combined order. For example, the communication may include at least a portion of first order information 150 related to the first order, such as information identifying the particular merchant 114 from which the first buyer 110(1) intends to order. In response to the communication, suppose that the second buyer 110(2) decides to accept the invitation to create a combined order, and selects one or more items 118 from the particular merchant 114 as a second order. Thus, the first buyer device 132(1) may receive, from the second buyer device 132(2) second order information 152 related to the one or more items included in the second order to be ordered from the particular merchant 114.

In response to receiving the second order information 152, the buyer application 134(1) may cause the buyer device 132(1) to send, to the service computing device 102, combinable order information 108, which may include, the first order information 150 and the second order information 152. For example, the first order information 150 may include first buyer account information that may be used to associate the first order information 150 with a first buyer account. The first buyer account may be associated with the first buyer device 132(1) and the first buyer 110(1). Similarly, the second order information 152 may include second buyer account information that may be used to associate the second order information 152 with a second buyer account. The second buyer account may be associated with the second buyer device 132(2) and the second buyer 110(2). Additionally, in other examples, the second buyer application 134(2) on the second buyer device 132(2) may send the combinable order information 108, including the first order information 150 and the second order information 152. As still another example, the first buyer application 134(1) may send the first order information 150 to the service computing device 102, and the second buyer application 134(2) may send the second order information 152 to the service computing device 102.

The order processing module 140 may combine the first order and the second order as a combined order, and send combined order information 112 to the particular merchant 114 identified by the first order information 150 and the second order information 152. Additionally, the order processing module 140 may send the combined order information 122 to a particular courier 120 who will pick up the combined order from a pickup location 124 of the particular merchant 114. The courier 120 delivers the combined order to one or more specified delivery locations. For instance, if the first buyer 110(1) and the second buyer 110(2) have indicated different delivery locations, the courier 120 may deliver the items 118 associated with the first order to the first delivery location 126(1) associated with the first order, and may deliver the items 118 associated with the second order to the second delivery location 126(2) associated with the second order.

As mentioned above, numerous variations will be apparent to those of skill in the art having the benefit of the disclosure herein. As one example, the buyers can create a combined order with friends who are nearby. For instance, each buyer participating in the combined order may be able to view the order information of each other participant in the combined order, such as participant's name, items ordered by each participant, amount paid, and so forth. The buyer application 134(1) on the first buyer device 132(1) may access a contact list of people known to the first buyer 110(1), or other such information, for determining to which buyers in the local proximity to send an invitation to join a combined order. In some cases, the participants may all order from the same merchant for delivery to the same delivery location.

As another example, such as in the case that the first buyer does not necessarily know the other buyers that are being invited to participate in the combined order, the other buyers may be provided limited order information from the first buyer, e.g., just the name of the merchant with whom the order will be placed and the time until the order is placed. For example, one or more buyers may receive a communication that a nearby buyer has placed an order with the first merchant, and the communication may invite the one or more buyers to participate in a combined order to order items from the first merchant. Thus, in some cases, the one or more buyers may participate in the combined order without ever knowing the identity of the first buyer, or the items ordered by the first buyer.

As still another example, a first buyer may select one or more items for an order with a merchant, and may pause the order to provide time for other buyers to participate in a combined order with the order of the first buyer. Accordingly, one or more buyers who are near to the delivery location of the first buyer may be offered the opportunity to order from the merchant selected by the first buyer to receive a reduction in the delivery fee. The one or more other buyers may not even know that they are participating in a combined order, but instead merely know that they are going to receive a discount if they order items from the first merchant before a time limit specified by the first buyer has expired. For instance, the first buyer may pause the order for a specified period of time (e.g., 5 minutes, 15 minutes, 20 minutes, 1 hour, etc.) to give other buyers an opportunity to join the first buyer in creating a combined order. When the time limit for the pause period has expired, if no other buyers have joined the first buyer in ordering from the particular merchant, the first buyer's order may be sent by the service provider to the particular merchant. Alternatively, before sending the order to the merchant, the service provider may inquire as to whether the first buyer would like to pause the order for an additional period of time.

As still another example, the first buyer may select one or more items to order from a particular merchant and may schedule the order for a future point in time, such as placing an order in the morning for delivery at dinnertime. When other buyers having delivery locations within a threshold distance of the first buyer's delivery location browse through a listing of merchants, the particular merchant selected by the first buyer may be presented as having a discounted delivery fee, or the like, based on the ability of the service provider to combine the order with the paused order of the first buyer. For instance, the other buyers may be instructed to place their orders for receiving delivery within a timeframe corresponding to a time at which the first buyer requested delivery of the first buyer's order. Accordingly, the other buyers may or may not know that they are participating in a combined order, but instead merely know that they are receiving a discounted delivery fee for ordering from a particular merchant for delivery to a particular location within a certain timeframe.

As mentioned above, in some examples a combined order may be an order in which all of the items included in the order are ordered from the same merchant. Alternatively, in other examples, a combined order may be created by ordering from two or more merchants within a threshold distance of each other, e.g., such that the courier can pick up both orders with only several minutes of additional time. As still another alternative, the service provider may determine that a combined order can be created based on a second merchant's pickup location being within a threshold distance of a route that will be traveled by the courier from a first merchant to the delivery location. Accordingly, in some examples, the order processing module 140 may schedule multiple pickups and deliveries with a single courier. For example, a first buyer may select a first merchant with which to place an order. The order processing module 140 may determine other merchants within a first threshold proximity to the first merchant, and also other merchants within a second threshold proximity to a route between the first merchant and the delivery location of the first buyer and/or the delivery location of the second buyer. Accordingly, the order processing module 140 may enable other buyers who wish to participate in a combined order with the first buyer to select from any merchant within the first threshold distance of the first merchant's pickup location and/or any merchant within the second threshold distance of the route between the first merchant's pickup location and the delivery location(s).

Each order in a combined order may have an associated spoilage time and contract time. The spoilage time may be the time between when the order is prepared and when the ordered items are considered to be of degraded quality, e.g., cold, soggy, melted, or otherwise less palatable than would be normally expected by the buyer. The contract time is the time by which the order is originally estimated to be delivered to the buyer when the buyer places the order. Accordingly, if the spoilage time and contract time of the first order permit, the courier may pick up one or more additional orders from pickup locations that may be nearby to the courier's route, and which may be delivered to one or more different delivery locations within respective contract times and spoilage times of the one or more additional orders.

As one example, suppose that the courier picks up a first order of a turkey sandwich and a salad with a spoilage time of 30 minutes and a contract time that expires 25 minutes from the pickup time. Further, suppose that along the route to the first delivery location for the first order, the courier picks up a second order of a pizza with a spoilage time of 20 minutes and a contract time that expires 20 minutes from the pickup time. For example, the second pickup location may be within a first threshold distance from the route of the courier, and the second delivery location may be within a second threshold distance from the first delivery location. The courier may lose several minutes stopping to pick up the second order, but is still able to deliver the first order to the first delivery location and the second order to the second delivery location before the expiration of the respective spoilage times or contract times of the two orders.

Figure 2:
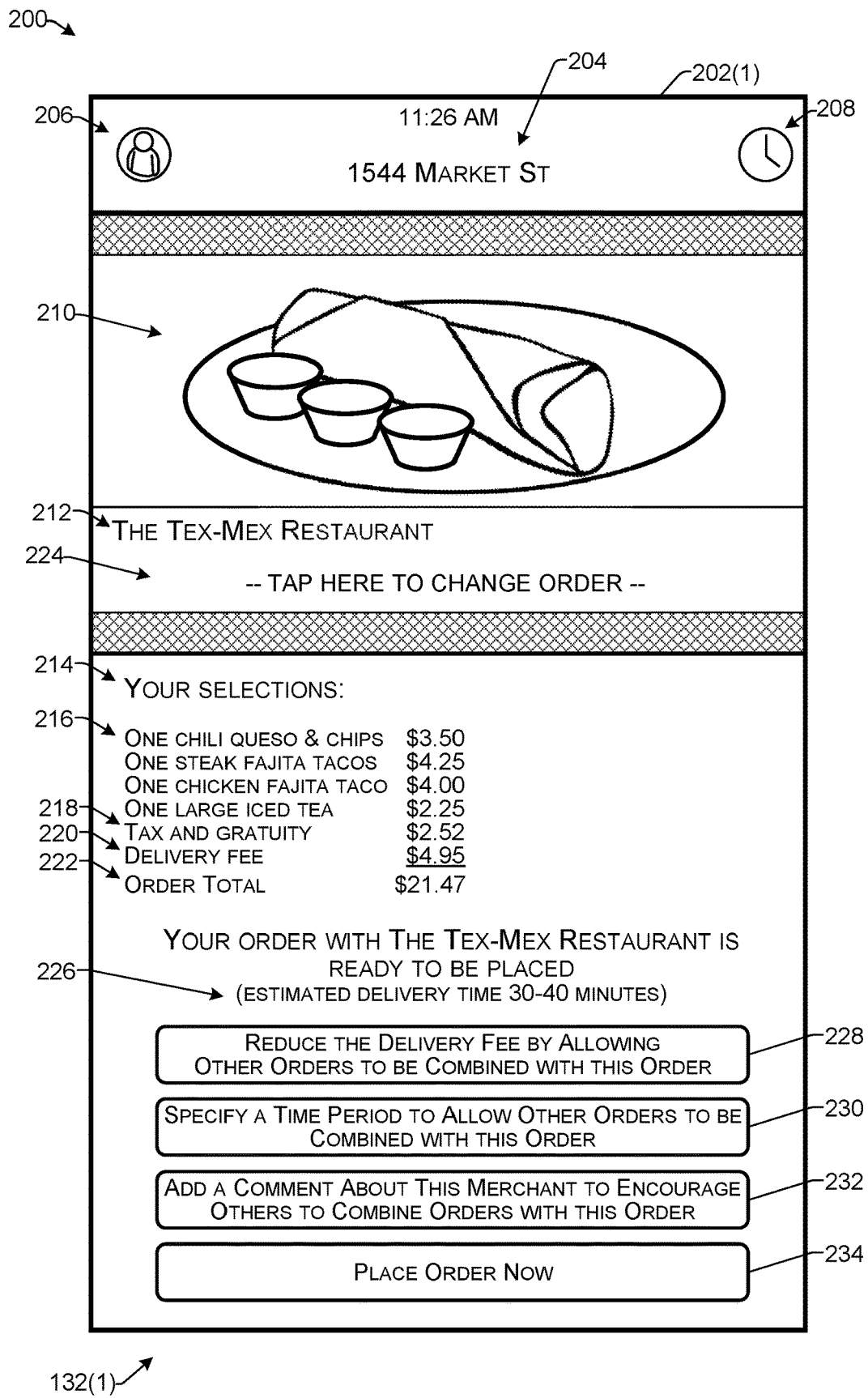
FIG. 2 illustrates an example user interface for combining orders for delivery according to some implementations.

FIG. 2 illustrates an example GUI 200 that may be presented on a display 202(1) associated with the first buyer device 132(1) according to some implementations. The GUI 200 presents information, such as information related to a first order to be placed by the first buyer using the first buyer device 132(1). The GUI 200 includes a delivery address 204 to which the first order will be delivered. In some examples, the delivery address 204 may be determined by the buyer application based on a current location of the first buyer device 132(1). For example, the current location may be determined from GPS information provided by an on-board GPS device, wireless access point information, cell tower information, and/or through various other techniques.

In some examples, the delivery location 204 may have been previously entered by the first buyer and/or may be a default location that may be changed by the first buyer through interaction of the first buyer with the GUI 200. For instance, suppose that when placing the order, the first buyer is at work, but is planning to go home to receive the order. Accordingly, the first buyer may specify the delivery location 204 to be the home address of the first buyer even though the first buyer is not currently near the home address. Consequently, in some examples, the other buyers who receive a communication to create a combined order with the first order may be within a threshold distance of the first buyer's home address and/or may have delivery locations within a threshold distance of the first buyer's home address.

The GUI 200 further includes a user icon 206 that the first buyer may select to change an account associated with the first order, or to access other account information of the first buyer's account. Additionally, the GUI 200 includes a clock icon 208 that the first buyer may select to change a time associated with the first order, such as for scheduling the first order to be delivered at a later time, e.g., later in the day, on a future date, or the like.

In the illustrated example, suppose that the first buyer has selected a particular merchant, which in this example is the Tex-Mex Restaurant, which is indicated by an identifying image 210 associated with the merchant, and a text name 212 of the merchant in the GUI 200. Further, suppose that the first buyer has already completed selection of several items from a menu of the selected merchant. Accordingly, as indicated at 214, the GUI 200 may present the selections made by the first buyer, which may include a listing 216 of the selected items and the price for each selected item. The listing 216 may further include a tax and gratuity amount 218 to be charged for the first order, a delivery fee 220 to be charged for the first order, and an order total amount 222 to be charged for the first order. If the first buyer desires to make any changes to the items selected, the first buyer may tap or otherwise select an area 224 in the GUI 200 to either add more items or remove a selected item. As indicated at 226, the GUI 200 may further present an estimated delivery time for the first order if the first buyer were to proceed immediately with placement of the first order.

The GUI 200 further includes a plurality of virtual controls that may be selected by the first buyer for performing additional operations with respect to the first order. For instance, a first virtual control 228 may be selected by the first buyer for attempting to reduce the delivery fee 220 by allowing other orders from other buyers to be combined with the first order. For example, if the first buyer selects the virtual control 228, the buyer application may perform operations for attempting to locate other buyers within a threshold distance of the first buyer device who may be interested in participating in a combined order with the first buyer. For instance, the buyer application may access a wireless communication interface on the first buyer device 132(1), such as a Wi-Fi communication interface, BLU-ETOOTH® low energy (BLE) communication interface, or the like.

In some cases, the buyer application may cause the first buyer device to communicate with any other buyer devices that have the buyer application installed and that are in radio communication with the same Wi-Fi access point, or that are near enough to be able to communicate directly with the first buyer device using BLE communications, other close range radio communications, or other close range wireless communication technologies. Thus, the first buyer device may send a close range radio signal to communicate with another buyer device that is within range of the close range radio signal. Additionally, or alternatively, the first buyer device may send a communication through a local wireless access point with which both the first buyer device and another buyer device are in local radio communication.

As another example, the buyer application may communicate with a geo-fence set up for a particular area within which the first buyer device 132(1) is currently located, and the buyer application may send the invitation to participate in the combined order only to other buyer devices determined to be within the geo-fenced area. For instance, the particular area may have an open geo-fence that is accessible to determine any other buyer devices currently within the geo-fenced area, such as based on GPS location information, RFID communications, or the like.

In some examples, the buyer application may obtain identifying information from the buyer applications on the other buyer devices before sending a communication to invite the other buyers to participate in the combined order. For instance, the buyer application may compare identifying information obtained from buyer applications on the other buyer devices with the first buyer's contacts list. The first buyer may specify that the first buyer application is to send an invitation only to nearby buyers who are already known to the first buyer. As another example, the GUI 200 may present a list of buyers who have been detected nearby, and the first buyer may select to which of these buyers the invitation for creating a combined order is sent. Alternatively, of course, in other examples, the buyer application may send the communication to any nearby buyer who also has an instance of the buyer application installed on that buyer's device.

As another example, the buyer application may send the first order information to the service computing device, and may include an indication that the service computing device is to attempt to locate other buyers who may be interested in creating a combined order with the first order. The service computing device may determine the delivery location 204 for the first order. The service computing device may send a communication to other buyer devices determined to be within a threshold distance of the delivery location, such as for informing the other buyers of the opportunity for participating in a combined order. As another example, the service computing device may send the communication to buyer devices that have been used in the past to place orders for delivery to delivery locations within a threshold distance from the first delivery location.

In some examples, both the buyer application and the service computing device may attempt to locate potential buyers to participate in a combined order. Thus, the buyer application on the buyer device 132(1) may attempt to locate nearby buyer devices using short range communications, while the service computing device may also attempt to locate other nearby buyer devices within a threshold distance of the delivery location based on location information received from the other buyer devices, or past history of buyers who have placed orders from the delivery location specified by the first buyer. In some cases, buyers may not want their locations to be tracked by the service computing device. Accordingly, if the service computing device does not know the current location of a particular buyer device, the service computing device may send an inquiry to the particular buyer device only if the particular buyer has ordered from a particular delivery location multiple times in the past and at a time of day that is near to the current time of day.

When the first buyer selects the first virtual control 228 to attempt to locate other buyers who may be interested in participating in a combined order, the placement of the order may be paused briefly while waiting for other buyers to be contacted and decide whether to participate in the order. As one example, the pause may be managed locally by the buyer application, and the buyer application may not send the first order to the service computing device until the paused period of time has elapsed or until the first buyer makes an additional input to send the first order (or the combined order) to the service computing device. As another example, the first order may be sent to the service computing device in response to selection of the virtual control 228, and the service computing device may hold the order from being sent to the merchant until the threshold time for the pause has expired, or until the first buyer instructs the service computing device to send the order to the merchant.

Thus, the first buyer can elect to delay placement of the order for a period of time to allow other buyers sufficient time to create a combined order with the first order. The buyer application may wait for a default period of time (i.e., a threshold time period), and if no other buyers place an order to be combined with the first order, the first order may proceed as a single order following expiration of the default period of time. In some examples, the first buyer may specify a threshold time period as to how long the first buyer is willing to wait for others to participate in creating a combined order. As one example, suppose that the default time period is 10 minutes. If the first buyer desires to specify a different time period, the first buyer may select a second virtual control 230 that is selectable to allow the first buyer to specify a threshold time period to allow other orders to be combined with the first order. Thus, the first buyer may elect to wait for a shorter amount of time than the default time period, e.g., only 5 minutes, or a longer amount of time, e.g., 15 minutes, 20 minutes, 30 minutes etc. Additionally, if the initial threshold time period expires with no other buyers accepting the invitation to participant in the combined order, the first buyer may be presented with an option to wait an additional period of time before placing the first order with the merchant. Further, the threshold time period may be based on a specified end time, e.g., the first buyer may specify that the threshold time period ends at 12:00 PM, 12:15 PM, etc.

As another example, if the buyer schedules the delivery for later in the day, then the threshold time period for allowing other buyers to participate in the combined order may expire at a point in time based on an estimated preparation time and estimated delivery time for the order. For instance, if the estimated preparation time for the order is 20 minutes and the estimated delivery time for the order is 20 minutes, then the threshold time for other buyers to participate in the order may expire 40 minutes before the scheduled delivery time. Thus, if the first buyer schedules the order for delivery by 6:00 PM, the other buyers may be able participate in the order until 5:20 PM, at which time the offer for the delivery discount may end.

In addition, to entice other buyers to order from the same merchant as the first buyer, the GUI 200 may present a third virtual control 232 that the first buyer may select to add a comment about the selected merchant to encourage other buyers to combine orders with the first order. For example, the buyer may select the third virtual control 232 and add a comment recommending that others try the first merchant or try particular items offered by the first merchant. Additionally, the GUI 200 may present a fourth virtual control 234, which the buyer may select to place the first order immediately, rather than attempting to create a combined order.

Figure 3:
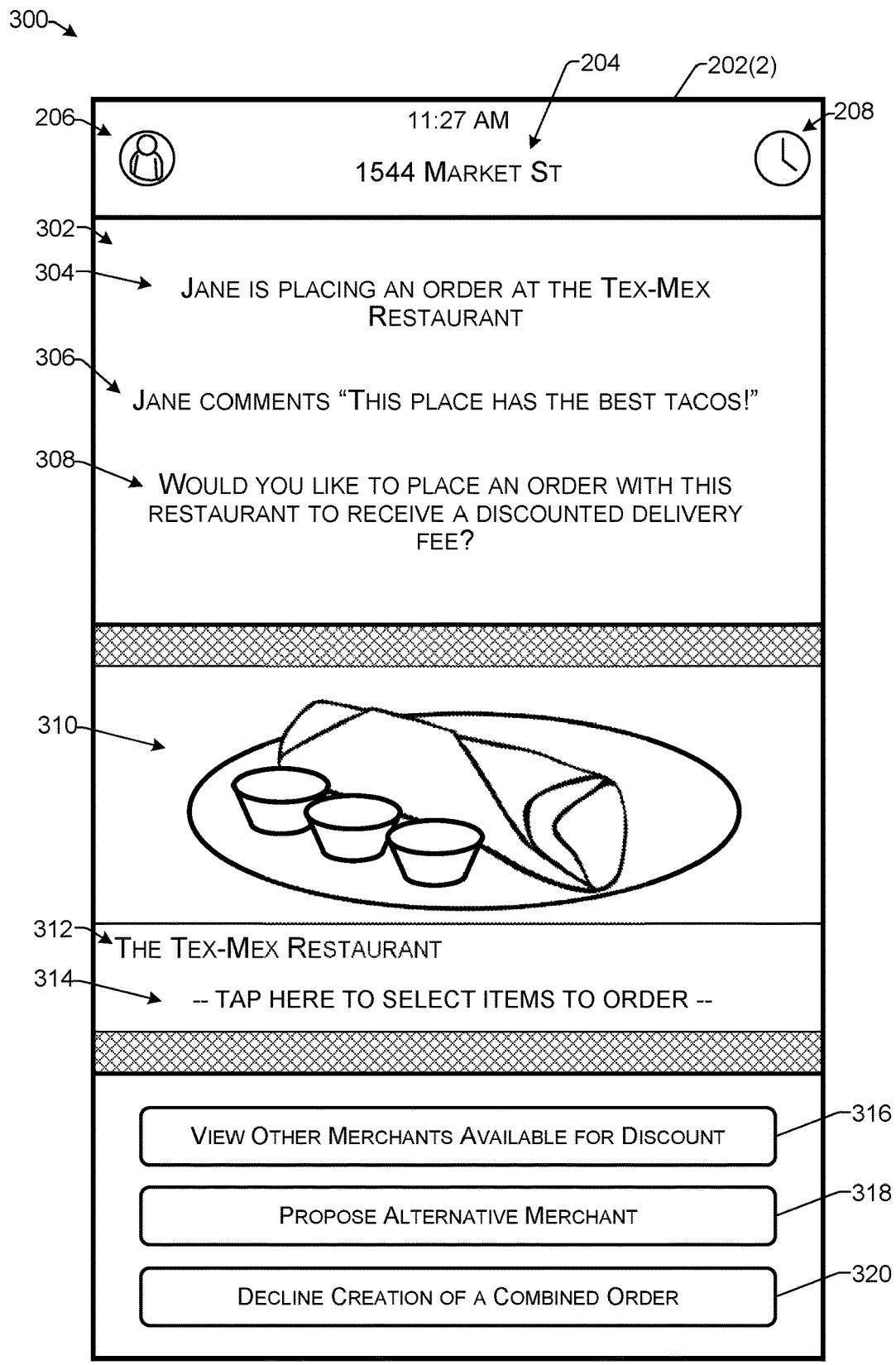
FIG. 3 illustrates an example user interface for combining orders for delivery according to some implementations.

FIG. 3 illustrates an example GUI 300 that may be presented on a display 202(2) associated with the second buyer device 132(2) according to some implementations. As one example, if the second buyer is within a threshold distance of the first buyer device, or other delivery location associated with the first order, the GUI 300 may be presented on the display 202(2) in response to the first buyer device or the service computing device sending a communication to the second buyer device 132(2) to invite the second buyer to participate in a combined order with the first order. For instance, the second buyer device 132(2) may receive at least identifying information of the merchant selected by the first buyer for placing the first order.

In some examples, the first buyer device or the service computing device may send the communication to join in an order to buyers that are known to the first buyer, such as may have been indicated by a contacts list or the like received from the first buyer. In other examples, the other buyers who receive the communication may or may not be known to the first buyer, and may be selected to receive the communication based on proximity to the delivery location specified by the first buyer, or based on having a saved delivery address within a threshold proximity to the delivery location specified by the first buyer. In some cases, two buyers who participate in a combined order may be located in the same office building, same apartment complex, same neighborhood, may be in radio communication with the same wireless access point, or the like, and may or may not know each other.

Accordingly, the second buyer device 132(2) may receive a communication inviting the second buyer to participate in a combined order with the first order created by the first buyer. The GUI 300 may present information 302 from the communication including, as indicated at 304, an indication that another buyer, who may be known to the second buyer in some cases, is placing an order with a particular merchant. In other examples, however, no identifying information about the first buyer is presented. Further, the GUI 300 may present a review or other comment 306 provided by the first buyer about the particular merchant, which may help entice the second buyer to place an order with the particular merchant. In addition, the GUI 300 may present an invitation 308 for the second buyer to place an order with the particular merchant such as for receiving a discount delivery fee. Further, the GUI 300 may present an image 310 associated with the particular merchant and the name 312 of the particular merchant.

If the second buyer decides to accept the invitation to create a combined order, the second buyer may tap or otherwise select an area 314 of the GUI 300 to begin selecting one or more items to include in the second order. For example, selecting the area 314 may cause the GUI 300 to present a menu of the items available to be selected for delivery from the particular merchant.

As an alternative, in some examples, the second buyer may be presented with a virtual control 316 to enable the second buyer to view other merchants with whom orders may be placed, rather than the particular merchant 312. For instance, as mentioned above, if one or more other merchants are within a threshold proximity to the merchant 312, the second buyer may be able to place an order with one of these other merchants and still be able to create a combined order for a discount. Similarly, if one or more other merchants are within a threshold proximity to a route that the courier will travel from the merchant 312 to the first delivery location of the first buyer and/or the second delivery location of the second buyer, then in some examples these other merchants also may be available for selection to create a combined order.

As another alternative, if the second buyer does not care for the items available from the merchant 312, the second buyer may select a second virtual control 318 to propose an alternative merchant to the first buyer. For example, selection of the virtual control 318 may enable the second buyer to send a communication to the first buyer with the proposed alternative merchant for creating a combined order. The alternative may be presented on the display of the first buyer's device and the first buyer may indicate acceptance or may decline the alternative merchant proposal. As still another alternative, the second buyer may select a third virtual control 320 to decline the invitation to create a combined order.

If the second buyer chooses to accept the first buyer's invitation to create a combined order, the second buyer may select one or more items from the menu of the merchant 312, and may select a place order virtual control, similar to that discussed above with respect to FIG. 2. In response, the buyer application on the second buyer device may send that the second order information to at least one of the first buyer device or the service computing device. For example, if the second order information is sent to the first buyer device, the first buyer may receive the second order information and may send the combined order to the service computing device as the combinable order information discussed above with respect to FIG. 1. Alternatively, if the second order information is sent by the second buyer device directly to the service computing device, at least one of the second buyer device or the service computing device may notify the first buyer device that the second order has been placed and combined with the first order. Any number of buyers may participate in a combined order using the techniques discussed above.

Further, the delivery fee or other incentives may be divided among the participants of the combined order using any of several techniques. As one example, the delivery fee or other incentive may be divided evenly among the participants of the combined order. As another example, the delivery fee or other discount may be divided among the participants based upon the dollar amount of each order with respect to a total dollar amount of the combined order.

The service computing device receives the second order information from at least one of the first buyer device or the second buyer device, and associates the second order information with the first order information as a combined order. The service computing device may send information about the combined order, including the first order information and the second order information, to the particular merchant. The service provider may further schedule a courier to pick up the combined order from a pickup location of the particular merchant. Thus, the courier may deliver the first order to the first buyer and the second order to the second buyer, either at the same delivery location or at specified different delivery locations that are within a threshold distance of each other.

Figure 4:
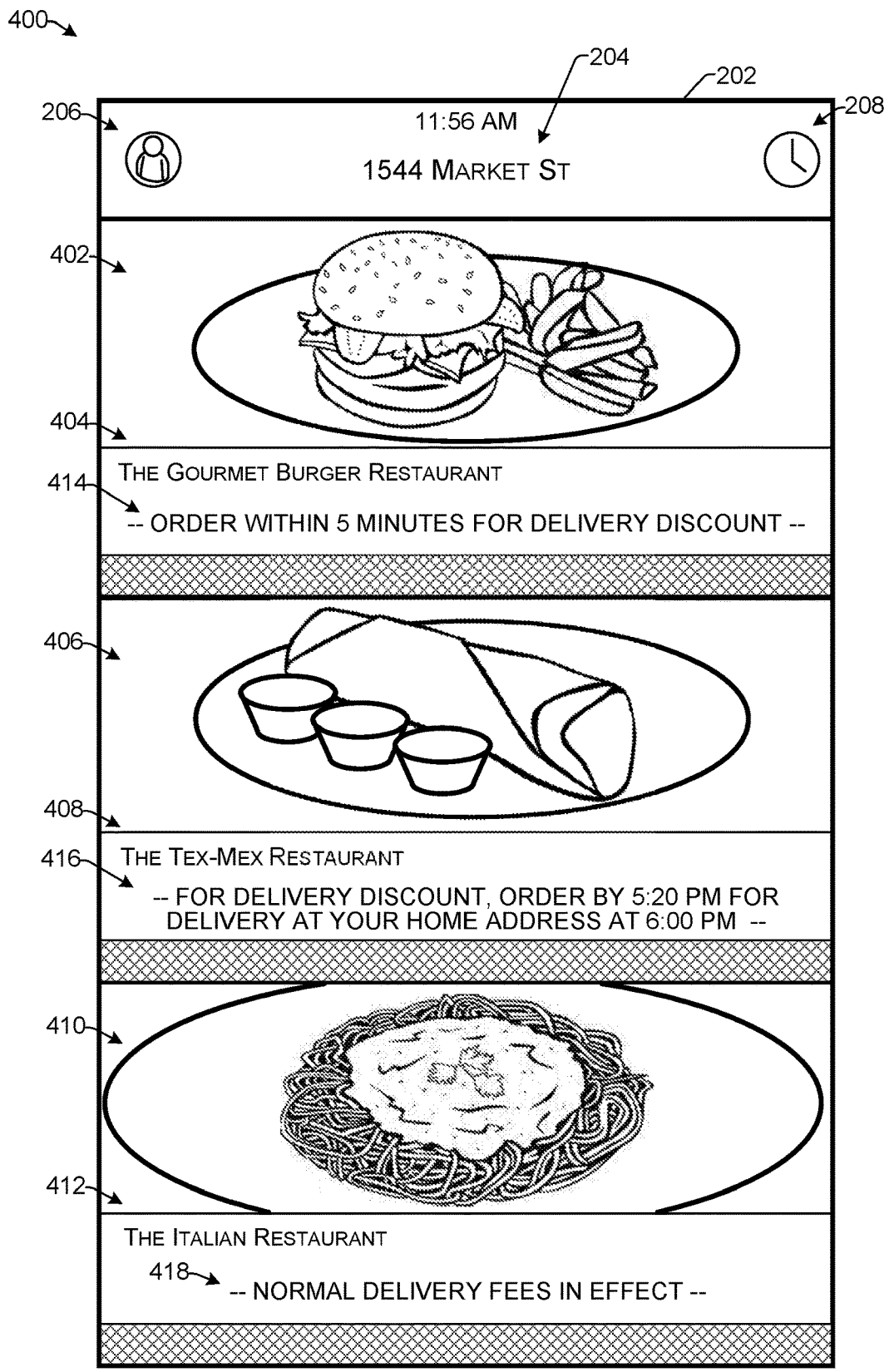
FIG. 4 illustrates an example user interface for combining orders for delivery according to some implementations.

FIG. 4 illustrates an example GUI 400 that may be presented on a display 202 associated with a buyer device 132 according to some implementations. As one example, the GUI 400 may be presented when a buyer accesses the buyer application 134 on the buyer device 132 to browse through a listing of merchants from whom the buyer may order items for delivery. The buyer application may determine the delivery location 204 to which the buyer is seeking delivery and may send the intended delivery location to the service computing device. For instance, when the buyer initially opens the buyer application on the buyer device 132, the buyer application may request that the buyer confirm a determined delivery location 204, such as by tapping on or otherwise selecting a virtual control (not shown in FIG. 4) presented on the display 202. When the buyer has verified or otherwise specified the delivery location 204 for the order, the buyer application may cause the buyer device to send the delivery location 204 to the service computing device.

In response to receiving the delivery location, the service computing device may send, to the buyer device 132, a listing of merchants with whom the buyer is able to place an order. In addition, the service computing device may compare the intended delivery location with any pending orders having delivery locations within a threshold distance of the delivery location 204 of the buyer. If there are such pending orders, the service computing device may be able to offer a discount on delivery fee or other incentive to the buyer if the buyer is willing to place an order for delivery with a particular merchant within a particular time period.

As one example, a buyer who is interested in paying a reduced delivery fee may be presented with a listing of merchants at which orders are currently pending, and which orders have delivery locations within a threshold distance of the delivery location of the buyer. Accordingly, the buyer may select a merchant from this list for placing an order, which may result in a discounted delivery fee for the order. As mentioned above, the list of merchants available for discounted delivery may include merchants within a threshold proximity to merchants having orders pending. As another example, if the buyer does not care to order from the merchants currently available for discounted delivery, the buyer may indicate a desire to be notified when additional merchants are selected for orders to be delivered to a delivery location within a threshold distance of the buyer's delivery location. As still another example, the buyer may indicate a desire to be notified whenever a particular merchant has a pending order that will be delivered to a delivery location within a threshold distance of the buyer's delivery location.

The GUI 400 may present information about a plurality of merchants from whom the buyer is able to order items for delivery, some of whom may be associated with discounted delivery fees. For example, the buyer may scroll through the listing of merchants, select a merchant from which to order, and then be presented with a menu of the items provided by the selected merchant. In the illustrated example, information about three merchants is presented in the GUI 400, including: an image 402 and a name 404 of a first merchant, i.e., The Gourmet Burger Restaurant; an image 406 and a name 408 of a second merchant, i.e., The Tex-Mex Restaurant; and an image 410 and a name 412 of a third merchant, i.e., The Italian Restaurant.

As one example, suppose that another buyer has already placed an order with The Gourmet Burger Restaurant and has placed a pause on the order to allow time for other buyers to join in creating a combined order. Further, suppose that the other buyer works in the same office building as the current buyer, and that 5 minutes remain in the threshold time period before the opportunity to participate in a combined order ends. As an example, the current buyer may have received a communication inviting the current buyer to create a combined order with The Gourmet Burger Restaurant. Alternatively, the current buyer may have merely decided to access the buyer application to order some lunch and, in response, the service computing device may have determined that the delivery location 204 of the current buyer is within a threshold distance of the delivery location of the other buyer that has already created an order with The Gourmet Burger Restaurant. In either case, as indicated at 414, the GUI 400 may present a message that the buyer may receive a delivery discount if the buyer places an order with The Gourmet Burger Restaurant within the next 5 minutes. Thus, the current buyer may select The Gourmet Burger Restaurant, select one or more items to order, and place the order within the specified time threshold, i.e., 5 minutes in this example, to create a combined order and receive a discount on delivery of the ordered items.

The service may create a combined order between the current buyer and the other buyer even though the two buyers may not know each other, and have no knowledge of what the other buyer is ordering from the selected merchant. Additionally, in some examples, the other buyer may not even be ordering from the same merchant as the current buyer. For example, as discussed above, the service computing device may enable the creation of combined orders with merchants that are within a threshold distance of one another, or within a threshold distance of a route between a selected merchant and a delivery location. Consequently, when creating a combined order, the current buyer may be able to select from several possible merchants, each of which may be within a threshold distance from a particular merchant selected by the other buyer.

As another example, suppose that the current buyer is at work and is placing an order for lunch. Further, suppose that the service computing device accesses the current buyer's account information, determines the current buyer's home address, and determines that another buyer that lives within a threshold distance of the current buyer's home has placed an order with The Tex-Mex Restaurant for delivery at 6:00 PM that evening. Accordingly, the service computing device may present with the listing for The Tex-Mex Restaurant a message 416 offering discounted delivery fees if the current buyer is willing to join in a combined order from The Tex-Mex Restaurant for delivery to the current buyer's home address at 6:00 PM that evening. As mentioned above, the threshold time for allowing other buyers to participate in the combined order may expire at a point in time based on an estimated preparation time and delivery time for the first order. For instance, if the estimated preparation time for the first order is 20 minutes and the estimated delivery time for the first order is 20 minutes, then the threshold time for other buyers to participate in a combined order with the first order may expire 40 minutes before the scheduled delivery time. Thus, if the other buyer scheduled the order for delivery by 6:00 PM, the current buyer may be able join in the order until 5:20 PM, at which time the offer for the delivery discount may end. Further, as mentioned above, in some examples the current buyer may be able to select from among a plurality of merchants that are within a threshold distance from The Tex-Mex Restaurant, and may have until the expiration of the threshold time period, i.e., until 5:20 PM in which to join the combined order. However, in some cases, if the preparation time associated with the nearby merchants is longer than 20 minutes, e.g., 30 minutes, then the threshold time period may be set to end sooner, e.g., 5:10 PM, based on the longer preparation time.

If the current buyer is not interested in the merchants available to be selected for a delivery discount, the buyer may select from any of the other merchants listed in the GUI 400, such as The Italian Restaurant, or any other merchant presented in the GUI 400. In some cases, as indicated at 418, a message may be presented to indicate that normal delivery fee prices are in effect for these merchants. Further, in some cases, the current buyer may request to be notified when additional merchants become available for discounted delivery, or when a particular merchant becomes available for discounted delivery.

Figure 5:
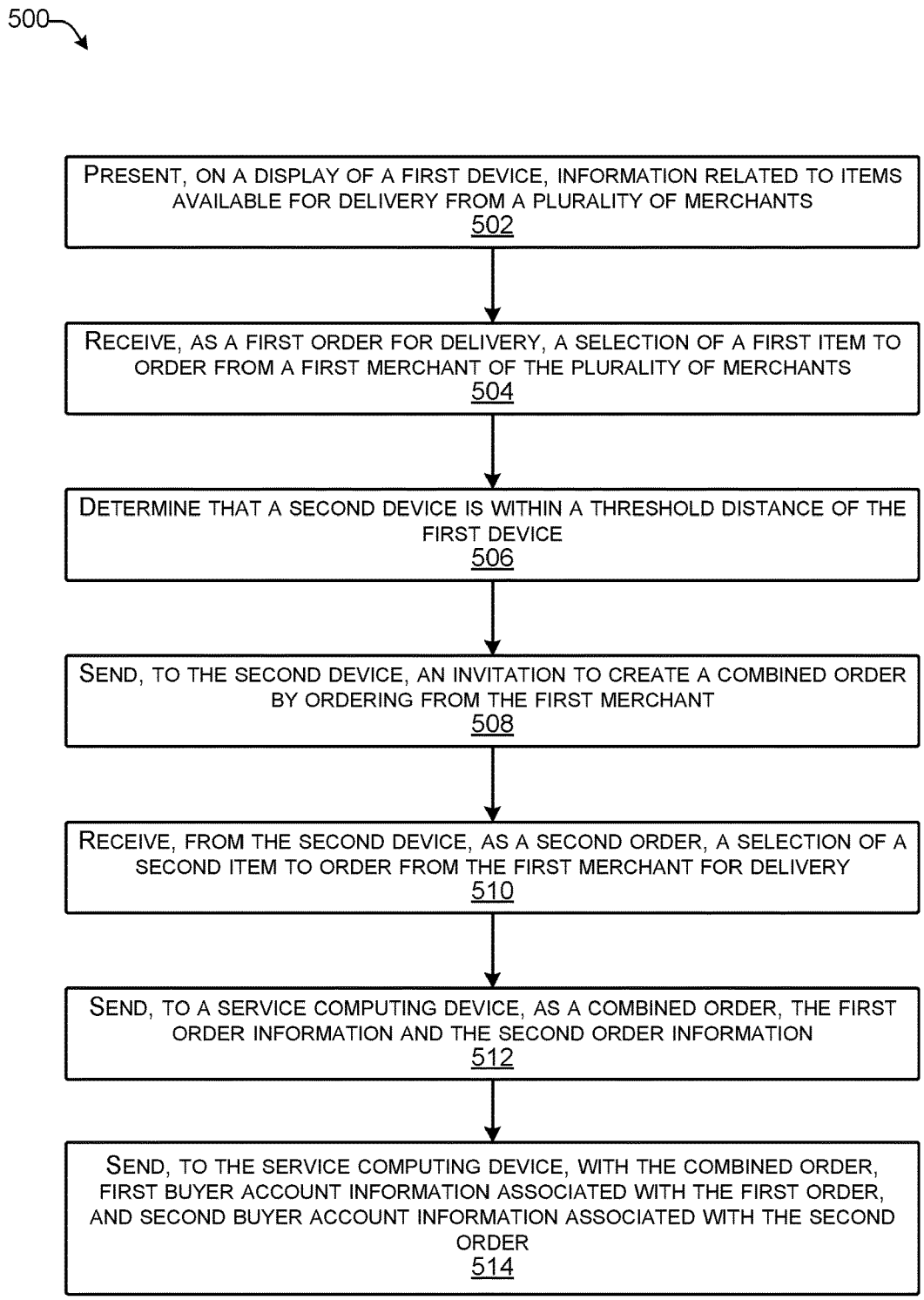
FIG. 5 is a flow diagram illustrating an example process for combining orders for delivery according to some implementations.
Figure 6:
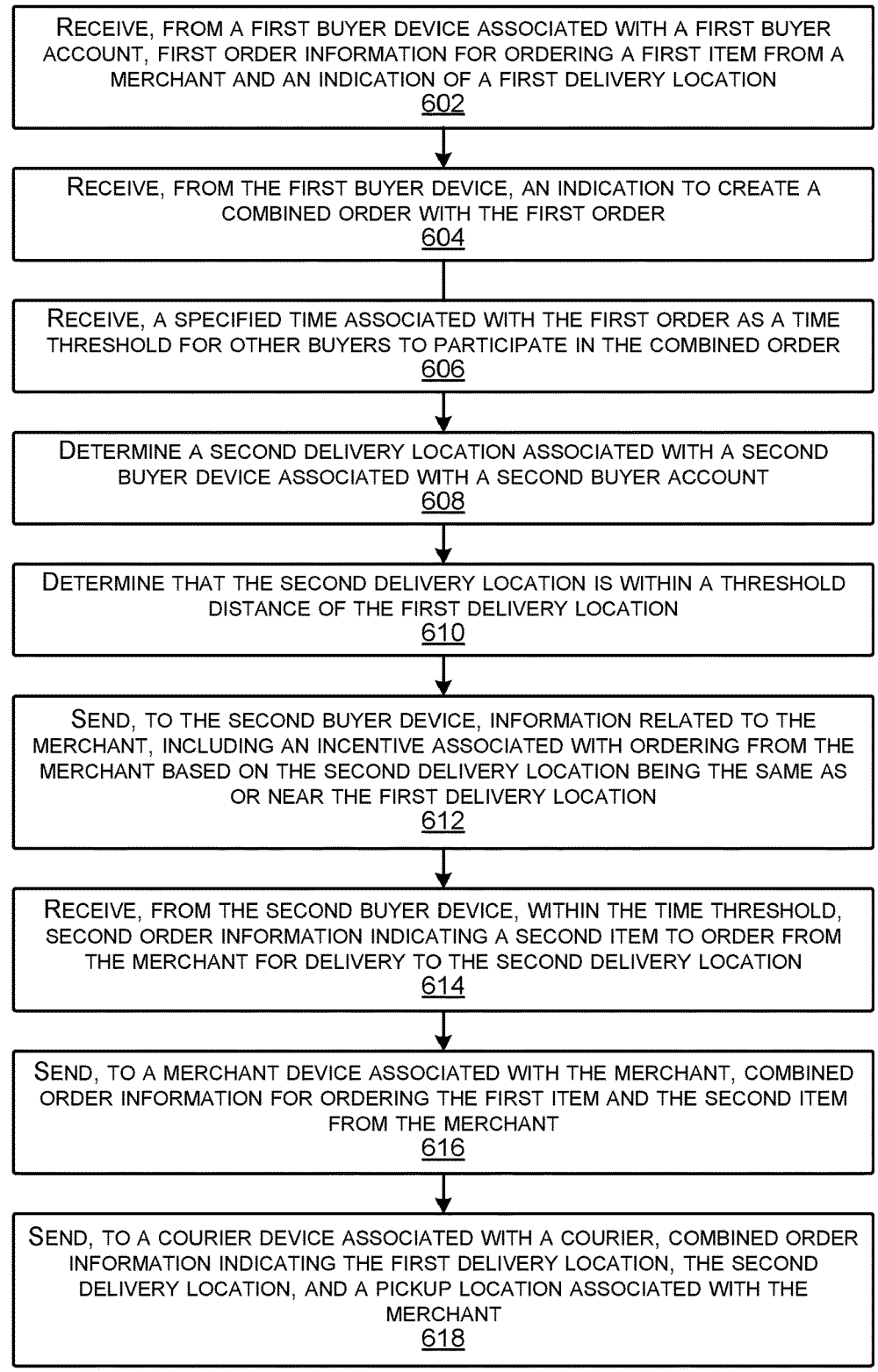
FIG. 6 is a flow diagram illustrating an example process for combining orders for delivery according to some implementations.

FIGS. 5 and 6 are flow diagrams illustrating example processes for enabling combined orders according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 5 is a flow diagram illustrating an example process 500 for combining orders for delivery according to some implementations. In some examples, the process may be executed by the buyer device 132 or by another suitable computing device.

At 502, the device may present, on a display of the device, information related to items available for delivery from a plurality of merchants. For example, the device may present a graphic user interface that enables the buyer to select a particular merchant, and select one or more items to order from the particular merchant.

At 504, the device may receive, as a first order for delivery, a selection of a first item to order from a first merchant of the plurality of merchants. For instance, the buyer may select a particular item from a particular merchant as a first order. The buyer may or may not send the first order information to the service computing device at this time.

At 506, the device may determine that a second device is within a threshold distance of the device. For instance, the device may send a close range radio signal to communicate with the second device, such as in the case where the second device is within range of the close range radio signal. As another example, the device may send a communication through a local wireless access point, such as in the case in which both the device and the second device are in local radio communication with the local wireless access point. As still another example, the device may receive information related to a geo-fenced area within which the device is currently located. For example, the device may receive contact information for a plurality of devices within the geo-fenced area that have an instance of the buyer application installed thereon. As still another example, the device may receive information from the service computing device regarding any buyer devices located near to a first delivery location and that have an instance of the buyer application installed.

At 508, the device may send, to the second device, an invitation to create a combined order by ordering an item from the first merchant. For instance, the device may send the name of the merchant, and an indication that the second buyer can receive an incentive for ordering from the particular merchant, such as a reduced delivery fee, if the order is placed within a threshold period of time.

At 510, the device may receive, from the second device, as a second order, a selection of a second item to order for delivery from the first merchant. For instance, the second device may send information about the second item to the first device. In other examples, the second device may send information about a second item directly to the service computing device with an indication that the second item is to be combined with the first item selected by the first buyer as a combined order.

At 512, the device may send, to a service computing device, as a combined order, the first order information and the second order information. The device may send information about the first item and information about a second item to the service computing device with an indication that these items are included in a combined order.

At 514, the device may send, to the service computing device, with the combined order, first buyer account information associated with the first order and second buyer account information associated with the second order. For example, the device may send at least an identifier associated with the first account and an identifier associated with the second account that enables the service computing device to associate the order for the first item with the first account and the order for the second item with the second account. As some examples, the identifier may be a name of the respective buyer, and account number associated with the respective buyer, or the like.

FIG. 6 is a flow diagram illustrating an example process 600 for combining orders for delivery according to some implementations. In some examples, the process may be executed by the service computing device or by another suitable computing device.

At 602, the computing device may receive, from a first buyer device associated with a first buyer, first order information for ordering a first item from a merchant and an indication of a first delivery location. For example, the first delivery location may be determined based on a current location of the first buyer device, such as may be indicated by location information received from the first buyer device, or may be specified by the first buyer when initiating the first order. Thus, the computing device may receive, from the first buyer device, location information from one or more location sensors associated with the first buyer device, and may determine an indicated first delivery location based at least in part on the location information from the one or more location sensors. For instance, the first buyer device may include one or more on-board sensors that can be used to determine a geographic location of the first buyer device, such as based on GPS information from a GPS device and/or from other location indicative information, such as nearby cell towers, wireless connection points, and the like, determined through one or more communication interfaces.

At 604, the computing device may receive, from the first buyer device, an indication to create a combined order with the first order. For example, the first buyer may select a virtual control in a user interface presented on the first buyer device to indicate that the first buyer would like to attempt to create a combined order, and this information may be sent to the service computing device.

At 606, the computing device may receive, from the first buyer device, a specified time associated with the first order as a threshold time for other buyers to participate in the combined order. For example, the specified time may be a default time, or a time that the first buyer enters into a user interface, during which placement of the first order is paused to allow other buyers to participate in a combined order with the first order. In some examples, the specified time may be a scheduled delivery time, such as for later in the day, or for a different day.

At 608, the computing device may determine a second delivery location associated with a second buyer device associated with a second buyer. For example, the computing device may determine whether there are any other buyer devices currently within a threshold distance of the first delivery location. For instance, if buyers currently have the buyer application and location information active on the buyer device, the computing device may determine buyers who are currently indicated to be within a threshold distance of the first delivery location. Thus, the computing device may receive, from the second buyer device, location information from one or more location sensors associated with the second buyer device, and may determine an indicated second delivery location based at least in part on the location information from the one or more location sensors. For instance, the second buyer device may include one or more on-board sensors that can be used to determine a geographic location of the second buyer device, such as based on GPS information from a GPS device and/or from other location indicative information, such as nearby cell towers, wireless connection points, and the like, determined through one or more communication interfaces. As another example, the computing device may determine whether any buyer devices have placed orders in the past for delivery locations within a threshold distance of the first delivery location. The computing device may send a communication to these buyer devices to determine whether there is any interest in participating in a combined order. As another example, when a second buyer opens the buyer application on the second buyer device, such as for placing an order, the computing device may compare an the second buyer's delivery location with the first delivery location to determine whether the second buyer's delivery location is within a threshold distance of the first delivery location. Other variations will also be apparent to those of skill in the art having the benefit of the disclosure herein.

At 610, the computing device may determine that the second delivery location is within a first threshold distance of the first delivery location. For instance, the threshold distance may be different for different environments, such as the respective delivery locations being in the same office building, same apartment complex, same neighborhood, connected to the same wireless access point, radio within a short range communication distance, or the like. As one example, the threshold distance may be sufficiently close such that the courier does not spend more than several minutes traveling from the first delivery location to the second delivery location.

At 612, the computing device may send, to the second buyer device, information related to the merchant selected by the first buyer. For example, the information may include information related to a discount or other incentive associated with ordering from the merchant based on the second delivery location being the same as or close to the first delivery location. Further, in some examples, the computing device may send, to the second buyer device, information related to other merchants that are within a threshold proximity to the merchant selected by the first buyer, or threshold proximity to a route that the courier will travel during delivery. The incentive may also be available for these other merchants based on their being within the threshold proximity to the merchant or the route.

At 614, the computing device may receive, from the second buyer device, within a threshold period of time, second order information indicating a second item to order from the merchant for delivery to the second delivery location. For instance, the second buyer may have to place an order within the threshold time, or the opportunity to receive the incentive may end.

At 616, the computing device may send, to a merchant device associated with the merchant, combined order information for ordering the first item and the second item from the merchant. For example, the service computing device may send the order to the merchant, and may receive a confirmation from the merchant that the order will be prepared by the merchant.

At 618, the computing device may send, to a courier device associated with a courier, combined order information indicating the first delivery location, the second delivery location, and a pickup location associated with the merchant. For instance, the service computing device may offer the delivery job to a courier, and provide the pickup and delivery location to the courier that accepts the delivery job. In some examples, the computing device may receive electronic communications from courier devices of couriers who are active for receiving delivery jobs. For instance, the computing device may be able to communicate over the one or more networks with a plurality of courier devices, some of which are associated with active couriers and some of which are associated with inactive couriers. The computing device may receive signals or other electronic communications from a subset of the courier devices associated with a subset of respective couriers who are active, or who desire to become active, and who are willing to receive assignments for delivery jobs. Further, the computing device may receive location information obtained from one or more location sensors associated with each courier device of an active courier. For instance, the courier devices of active couriers may report their current locations to the service computing device based on information from one or more on-board sensors, such as based on GPS information from a GPS device and/or other location indicative information, such as nearby cell towers, wireless connection points, and the like, determined through one or more communication interfaces. Thus, the subset of courier devices associated with active couriers may communicate with the computing device, and may send location information obtained from one or more location sensors associated with each courier device. The location information may indicate respective geographic locations of each of the courier devices. The computing device may determine respective indicated locations of the subset of courier devices within the service region. Based on the indicated locations, the computing device may select a particular courier to which to assign the order, so as to minimize courier travel time to the pickup location. If there is not an active courier nearby, the computing device may send a message to a courier device associated with at least one inactive courier for activating the inactive courier. For example, the computing device may send messages to a one or more courier devices associated with inactive couriers to determine a current location of the inactive couriers and/or to determine whether the inactive couriers are interested in becoming active to start delivering orders. If there is an inactive courier near the pickup location who is interested in becoming active, the delivery job may be assigned to that courier.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 7:
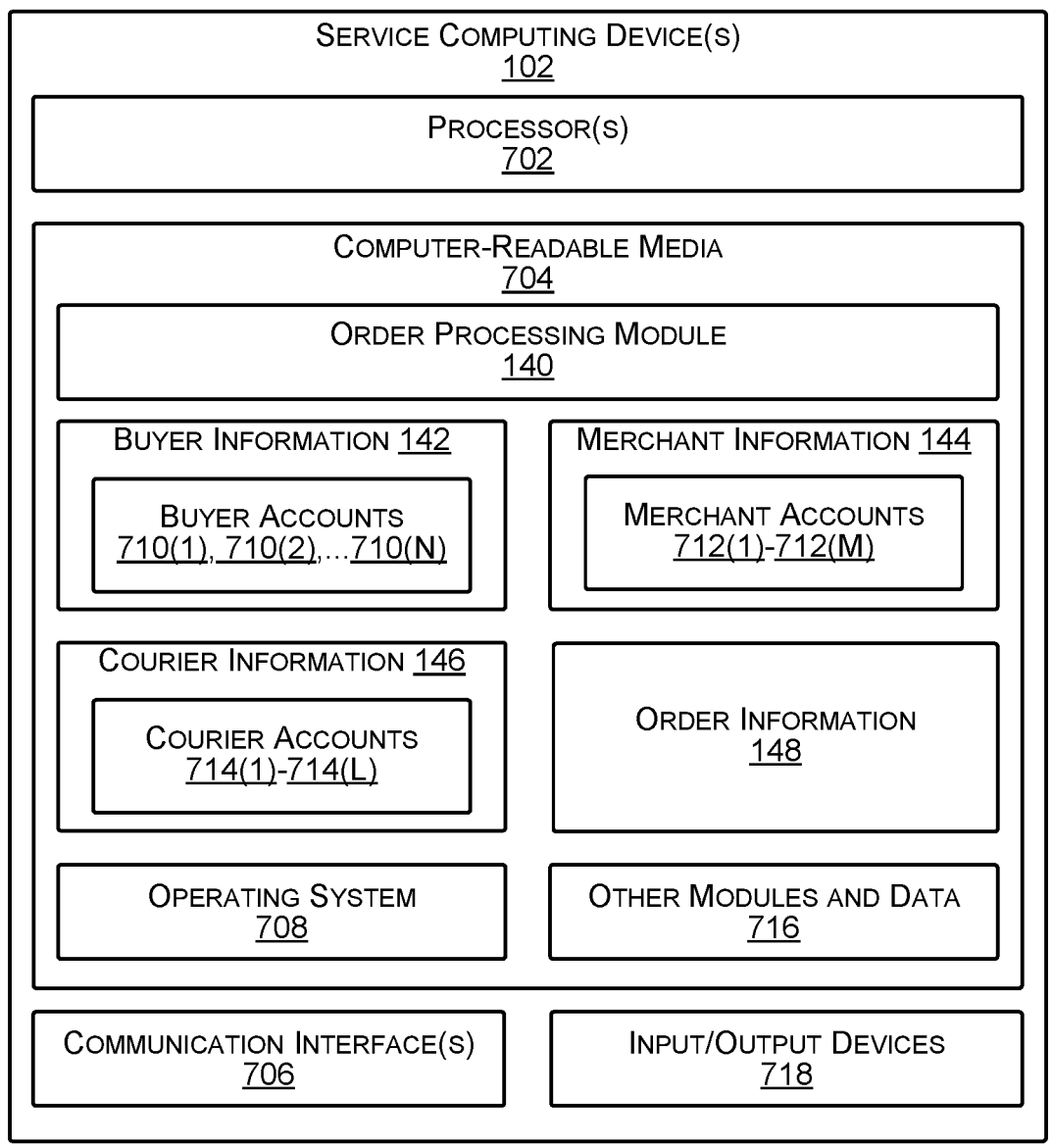
FIG. 7 illustrates select components of one or more example service computing devices according to some implementations.

FIG. 7 illustrates select components of the service computing device 102 that may be used to implement some functionality of the combined ordering services described herein. The service computing device 102 may include one or more servers or other types of computing devices that may be embodied in any number of ways. For instance, in the case of a server, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may alternatively be distributed across different computing devices and different locations in any manner Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, each service computing device 102 may include one or more processors 702, one or more computer-readable media 704, and one or more communication interfaces 706. Each processor 702 may be a single processing unit or a number of processing units, and may include single or multiple computing units or multiple processing cores. The processor(s) 702 can be implemented as one or more microprocessors, microcomputers, microcontrollers, digital signal processors, central processing units, state machines, logic circuitries, and/or any devices that manipulate signals based on operational instructions. For instance, the processor(s) 702 may be one or more hardware processors and/or logic circuits of any suitable type specifically programmed or configured to execute the algorithms and processes described herein. The processor(s) 702 can be configured to fetch and execute computer-readable instructions stored in the computer-readable media 704, which can program the processor(s) 702 to perform the functions described herein.

The computer-readable media 704 may include volatile and nonvolatile memory and/or removable and non-removable media implemented in any type of technology for storage of information, such as computer-readable instructions, data structures, program modules, or other data. Such computer-readable media 704 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 704 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 704 may be used to store any number of functional components that are executable by the processors 702. In many implementations, these functional components comprise instructions or programs that are executable by the processors 702 and that, when executed, specifically configure the one or more processors 702 to perform the actions attributed above to the service computing device 102. Functional components stored in the computer-readable media 704 may include the order processing module 140, which may receive and combine orders, and perform various other functions, as discussed herein. Additional functional components stored in the computer-readable media 704 may include an operating system 708 for controlling and managing various functions of the service computing device 102.

In addition, the computer-readable media 704 may store data used for performing the operations described herein. Thus, the computer-readable media 704 may store: the buyer information 142, including buyer accounts 710(1), 710(2), . . . 710(N) associated with to the respective buyers 110(1), 110(2), . . . 110(N); the merchant information 144, including merchant accounts 712(1)-712(M) associated with the respective merchants 114(1)-114(M); the courier information 146, including courier accounts 714(1)-714(L) associated with the respective couriers 120(1)-120(L); and the order information 148. The service computing device 102 may also include or maintain other functional components and data not specifically shown in FIG. 7, such as other modules and data 716, which may include programs, drivers, etc., and the data used or generated by the functional components. Further, the service computing device 102 may include many other logical, programmatic and physical components, of which those described above are merely examples that are related to the discussion herein.

The communication interface(s) 706 may include one or more interfaces and hardware components for enabling communication with various other devices, such as over the network(s) 106. For example, communication interface(s) 706 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

The service computing device 102 may further be equipped with various input/output (I/O) devices 718. Such I/O devices 718 may include a display, various user interface controls (e.g., buttons, joystick, keyboard, mouse, touch screen, etc.), audio speakers, connection ports and so forth.

Figure 8:
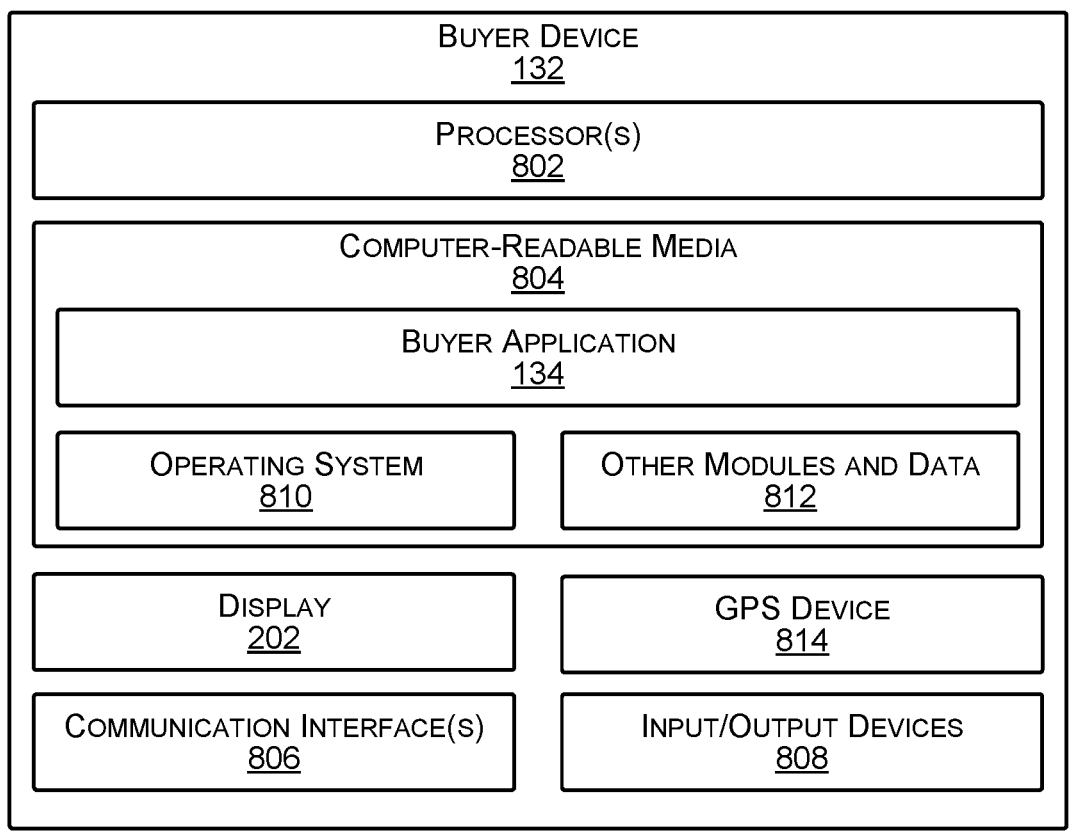
FIG. 8 illustrates select components of an example buyer device according to some implementations.

FIG. 8 illustrates select example components of the buyer device 132 that may implement the functionality described above according to some examples. The buyer device 132 may be any of a number of different types of portable computing devices. Some examples of the buyer device 132 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein. Further, in some examples, the buyer device 132 may be a stationary or semi-stationary computing device, such as a desktop computer or other device with computing capabilities.

In the example of FIG. 8, the buyer device 132 includes components such as at least one processor 802, one or more computer-readable media 804, one or more communication interfaces 806, and one or more input/output (I/O) devices 808. Each processor 802 may itself comprise one or more processors or processing cores. For example, the processor 802 can be implemented as one or more microprocessors, microcomputers, microcontrollers, digital signal processors, central processing units, state machines, logic circuitries, and/or any devices that manipulate signals based on operational instructions. In some cases, the processor 802 may be one or more hardware processors and/or logic circuits of any suitable type specifically programmed or configured to execute the algorithms and processes described herein. The processor 802 can be configured to fetch and execute computer-readable processor-executable instructions stored in the computer-readable media 804.

Depending on the configuration of the buyer device 132, the computer-readable media 804 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 804 may include, but is not limited to, RAM, ROM, EEPROM, flash memory, solid-state storage, magnetic disk storage, optical storage, and/or other computer-readable media technology. Further, in some cases, the buyer device 132 may access external storage, such as RAID storage systems, storage arrays, network attached storage, storage area networks, cloud storage, or any other medium that can be used to store information and that can be accessed by the processor 802 directly or through another computing device or network. Accordingly, the computer-readable media 804 may be computer storage media able to store instructions, modules or components that may be executed by the processor 802. Further, when mentioned, non-transitory computer-readable media exclude media such as energy, carrier signals, electromagnetic waves, and signals per se.

The computer-readable media 804 may be used to store and maintain any number of functional components that are executable by the processor 802. In some implementations, these functional components comprise instructions or programs that are executable by the processor 802 and that, when executed, implement operational logic for performing the actions and services attributed above to the buyer device 132. Functional components of the buyer device 132 stored in the computer-readable media 804 may include the buyer application 134, as discussed above, which may present the buyer with one or more GUIs for creating orders, some examples of which are described above. Additional functional components may include an operating system 810 for controlling and managing various functions of the buyer device 132 and for enabling basic user interactions with the buyer device 132.

In addition, the computer-readable media 804 may also store data, data structures and the like, that are used by the functional components. Depending on the type of the buyer device 132, the computer-readable media 804 may also optionally include other functional components and data, such as other modules and data 812, which may include applications, programs, drivers, etc., and the data used or generated by the functional components. Further, the buyer device 132 may include many other logical, programmatic and physical components, of which those described are merely examples that are related to the discussion herein.

The communication interface(s) 806 may include one or more interfaces and hardware components for enabling communication with various other devices, such as over the network(s) 106 or directly. For example, communication interface(s) 806 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

FIG. 8 further illustrates that the buyer device 132 may include the display 202. Depending on the type of computing device used as the buyer device 132, the display 202 may employ any suitable display technology. For example, the display 202 may be a liquid crystal display, a plasma display, a light emitting diode display, an OLED (organic light-emitting diode) display, an electronic paper display, or any other suitable type of display able to present digital content thereon. In some examples, the display 202 may have a touch sensor associated with the display 202 to provide a touchscreen display configured to receive touch inputs for enabling interaction with a GUI presented on the display 202. Accordingly, implementations herein are not limited to any particular display technology. Alternatively, in some examples, the buyer device 132 may not include a display.

The buyer device 132 may further include the one or more I/O devices 808. The I/O devices 808 may include speakers, a microphone, a camera, and various user controls (e.g., buttons, a joystick, a keyboard, a keypad, etc.), a haptic output device, and so forth. Other components included in the buyer device 132 may include various types of sensors, which may include a GPS device 814 able to indicate location information, as well as other sensors (not shown) such as an accelerometer, gyroscope, compass, proximity sensor, and the like. In some cases, the GPS device 814 may be used by the buyer application 134 to determine a current geographic location of the buyer device 132. Additionally, or alternatively, the communication interfaces 806 may be used to determine the current location of the buyer device, such as based on communication with nearby cell towers, wireless access points, and the like. In some examples, the buyer application 134 may send this location information to the service computing device as an indicated delivery location for the associated buyer. Additionally, the buyer device 132 may include various other components that are not shown, examples of which include removable storage, a power source, such as a battery and power control unit, and so forth. Further, the courier device 136 and/or the merchant device 128 may include hardware structures and components similar to those described for the buyer device 132, but with one or more different functional components.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
    receiving, by a computing device, from a first user device, a communication indicating a request to create a combined order for items offered by one or more merchants, wherein the combined order enables a plurality of users to independently purchase individual ones of the items from the one or more merchants;
    creating the combined order based on a selection received from the first user device of a first item from a first merchant of the one or more merchants, wherein the first user device is associated with a first user of the plurality of users;
    determining a first location associated with the first user device;
    determining that a second location associated with a second user device is within a threshold distance of the first location associated with the first user device, wherein the second user device is associated with a second user of the plurality of users;
    based at least partially on determining that the second location is within the threshold distance of the first location, sending the information related to creation of the combined order to the second user device associated with the second user;

receiving, from the second user device associated with the second user, a selection of a second item from one of the first merchant or a second merchant of the one or more merchants; and processing, by the computing device, the first item and the second item for the combined order as a single order to perform at least one action.

2. The method as recited in claim 1, wherein processing the first item and the second item for the combined order as a single order to perform at least one action comprises assigning delivery of the first item and the second item for the combined order to a same courier to deliver the first item to the first location associated with the first user device and deliver the second item to the second location associated with the second user device.

3. The method as recited in claim 1, wherein creating the combined order further comprises sending, to the second user device, information related to creation of the combined order to cause, at least in part, the information related to the creation of the combined order to be presented in a user interface on the second user device.

4. The method as recited in claim 1, wherein the second location is at least one of a past delivery location associated with the second user device, or an indicated current location of the second user device.

5. The method as recited in claim 1, wherein sending the information related to creation of the combined order to the second user device further comprises sending, to the second user device, information related to the one or more merchants based on the selection of the first item received from the first user device.

6. The method as recited in claim 1, wherein creating the combined order includes associating a time threshold with the combined order for limiting an amount of time for the plurality of users to participate in the combined order.

7. The method as recited in claim 1, wherein creating the combined order comprises sending, to the second user device, a communication including information identifying the one or more merchants to cause, at least in part, information related to the combined order and the one or more merchants to be presented in a user interface on the second user device.

8. The method as recited in claim 1, wherein creating the combined order includes sending information about the first merchant and the second merchant to the second user device, based on determining the second merchant is eligible for the combined order, to cause, at least in part, information related to the combined order, the first merchant and the second merchant to be presented in a user interface on the second user device, wherein the second merchant is determined to be eligible for the combined order based on at least one of:
the second merchant is within a second threshold distance of the first merchant, or
the second merchant within a third threshold distance of a route between the first merchant and the location associated with the first user device.

9. A method comprising:
receiving, by a computing device, from a first user device of a plurality of user devices, a communication indicating a request to create a combined order associated with one or more items offered by a merchant, wherein the combined order enables a plurality of users to independently purchase the one or more items from the merchant;
creating the combined order, wherein the combined order is accessible by the plurality of user devices for adding items to the combined order;

receiving a selection of a first item from the first user device, the first user device associated with a first location;
determining that a second location associated with a second user device is within a threshold distance of the first location associated with the first user device;
sending the information related to creation of the combined order to the second user device based at least partially on determining that the second location associated with the second user device is within the threshold distance of the first location associated with the first user device;
receiving a selection of a second item from the second user device;
receiving, from a courier device, location information indicating a location of the courier device; and
processing, by the computing device, the first item and the second item selected for the combined order as a single order by, based on the location information, assigning delivery of the first item and the second item for the combined order to a same courier to deliver the first item to the first location associated with the first user device and deliver the second item to the second location associated with the second user device.

10. The method as recited in claim 9, wherein the computing device receives the location information from the courier device via an application programming interface.

11. The method as recited in claim 9, wherein creating the combined order further comprises associating a time threshold with the combined order for limiting an amount of time for completion of the combined order.

12. The method as recited in claim 9, wherein the location associated with the second user device is at least one of a past delivery location associated with the second user device, or an indicated current location of the second user device.

13. The method as recited in claim 9, wherein sending, to the second user device, the information related to the creation of the combined order further comprises sending, to the second user device, information related to the merchant to cause, at least in part, information related to the combined order and the merchant to be presented in a user interface on the second user device.

14. The method as recited in claim 9, wherein sending, to the second user device, the information related to the creation of the combined order further comprises sending a communication to the second user device to cause an invitation to join the combined order to be presented on a display of the second user device.

15. The method as recited in claim 9, further comprising:
determining a contact list associated with the first user device; and
sending the information related to creation of the combined order to the second user device further based on determining that the second user device is associated with a contact included in the contact list associated with the first user device.

16. The method as recited in claim 9, wherein:
there are a plurality of the merchants; and
creating the combined order includes determining that the plurality of merchants are at least one of:
within a first threshold distance of each other; or
within a second threshold distance of a route between a selected merchant and the location associated with the first user device.

17. A system comprising:
one or more processors;
one or more computer-readable media storing executable instructions that, when executed by one or more processors, configure the one or more processors to perform operations comprising:
  receiving, from a first user device of a plurality of user devices, a communication indicating a request to create a combined order for items offered by one or more merchants, wherein the combined order enables a plurality of users to independently purchase individual ones of the items from the one or more merchants;
  creating, based on a selection received from the first user device of a first item from a first merchant, the combined order, wherein the first user device is associated with a first user of the plurality of users;
  determining a first location associated with the first user device;
  determining that a second location associated with a second user device is within a threshold distance of the first location associated with the first user device, wherein the second user device is associated with a second user of the plurality of users;
  based at least partially on determining that the second location is within the threshold distance of the first location, sending the information related to creation of the combined order to the second user device associated with the second user;
  receiving, from the second user device of the plurality of user devices, a selection of a second item from one of the first merchant or a second merchant of the one or more merchants; and
  processing the first item and the second item added to the combined order as a single order to perform at least one action.

18. The system as recited in claim 17, wherein the operation of processing the items added to the combined order as a single order to perform at least one action comprises assigning delivery of the first item and the second item added to the combined order to a same courier to deliver the first item to the first location associated with the first user device and deliver the second item to the second location associated with the second user device.

19. The system as recited in claim 17, wherein the operation of creating the combined order further comprises sending, to the second user device, information related to creation of the combined order.

20. The system as recited in claim 17, wherein the second location is at least one of a past delivery location associated with the second user device, or an indicated current location of the second user device.

21. The system as recited in claim 17, wherein the operation of sending, to the second user device, the information related to the creation of the combined order further comprises sending information related to the one or more merchants to cause, at least in part, the information related to the combined order and the information related to the one or more merchants to be presented in a user interface on the second user device.

22. The system as recited in claim 17, wherein creating the combined order includes sending information about the first merchant and the second merchant to the second user device, based on determining the second merchant is eligible for the combined order, to cause, at least in part, information related to the combined order, the first merchant and the second merchant to be presented in a user interface on the second user device, wherein the second merchant is determined to be eligible for the combined order based on at least one of:
  the second merchant is within a second threshold distance of the first merchant, or
  the second merchant within a third threshold distance of a route between the first merchant and the location associated with the first user device.

* * * * *